United States Patent
Bajic et al.

(10) Patent No.: US 8,888,573 B2
(45) Date of Patent: Nov. 18, 2014

(54) SEAT CONDITIONING MODULE AND METHOD

(75) Inventors: Goran Bajic, Belle River (CA); Syed Iqbal, Tecumseh (CA); Dmitri Axakov, Windsor (CA); Matthew Zuzga, Macomb, MI (US)

(73) Assignee: W.E.T. Automotive Systems AG, Odelzhausen (DE)

( * ) Notice: Subject to any disclaimer, the term of this patent is extended or adjusted under 35 U.S.C. 154(b) by 1148 days.

(21) Appl. No.: 12/742,161

(22) PCT Filed: Dec. 3, 2008

(86) PCT No.: PCT/US2008/085344

§ 371 (c)(1),
(2), (4) Date: Sep. 7, 2010

(87) PCT Pub. No.: WO2009/076123

PCT Pub. Date: Jun. 18, 2009

(65) Prior Publication Data

US 2010/0327637 A1 Dec. 30, 2010

Related U.S. Application Data

(60) Provisional application No. 61/012,616, filed on Dec. 10, 2007.

(51) Int. Cl.
*B60N 2/56* (2006.01)

(52) U.S. Cl.
CPC .............. *B60N 2/565* (2013.01); *B60N 2/5692* (2013.01); *B60N 2/5657* (2013.01); *B06N 2/5635* (2013.01)
USPC ........ 454/120; 454/245; 454/240; 297/180.1; 297/180.14; 297/180.11

(58) Field of Classification Search
CPC .. B60N 2/5645; B60N 2/5657; B60N 2/5692; B60N 2/5635
USPC ............. 454/120; 297/452.42, 180.1, 180.14, 297/180.11
See application file for complete search history.

(56) References Cited

U.S. PATENT DOCUMENTS

| | | | |
|---|---|---|---|
| 2,022,959 | A | 12/1935 | Gordon |
| 2,158,801 | A | 5/1939 | Petterson |

(Continued)

FOREIGN PATENT DOCUMENTS

| | | |
|---|---|---|
| DE | 19503291 | 8/1996 |
| DE | 10013492 | 9/2001 |

(Continued)

OTHER PUBLICATIONS

Co-pending Japanese office action, Application No. 2010-538053 Dated May 8, 2012.

(Continued)

*Primary Examiner* — Steven B McAllister
*Assistant Examiner* — Frances H Kamps
(74) *Attorney, Agent, or Firm* — The Dobrusin Law Firm, P.C.

(57) ABSTRACT

A seat conditioning module for a seat conditioning assembly including an air mover, an intake port, outtake port, wherein at least one of the intake port, the outtake port, or both are in fluid communication with a seat surface. A valve assembly with at least two apertures movably disposed between the air mover and the at least one intake and at least one outtake ports. An actuation device for moving the valve assembly to control the passage of the fluid through the at least two apertures. An optional conditioning device in fluid communication with the air mover and the seat surface. A control device for at least controlling the position of the at least two apertures of the valve assembly, the activation of the optional conditioning device, the operation of the air mover, or any combination thereof.

15 Claims, 18 Drawing Sheets

(56) References Cited

U.S. PATENT DOCUMENTS

| | | | |
|---|---|---|---|
| 2,782,834 A | 2/1957 | Vigo | |
| 2,912,832 A | 11/1959 | Clark | |
| 2,978,972 A | 4/1961 | Hake | |
| 3,101,660 A | 8/1963 | Taylor | |
| 3,127,931 A | 4/1964 | Johnson | |
| 3,209,380 A | 10/1965 | Watsky | |
| 3,486,177 A | 12/1969 | Marshack | |
| 3,529,310 A | 9/1970 | Olmo | |
| 3,550,523 A | 12/1970 | Segal | |
| 3,653,589 A | 4/1972 | McGrath | |
| 3,681,797 A | 8/1972 | Messner | |
| 3,736,022 A | 5/1973 | Radke | |
| 3,738,702 A | 6/1973 | Jacobs | |
| 3,757,366 A | 9/1973 | Sacher | |
| 3,770,318 A | 11/1973 | Fenton | |
| 3,778,851 A | 12/1973 | Howorth | |
| 3,948,246 A | 4/1976 | Jenkins | |
| 4,002,108 A | 1/1977 | Drori | |
| 4,043,544 A | 8/1977 | Ismer | |
| 4,060,276 A | 11/1977 | Lindsay | |
| 4,072,344 A | 2/1978 | Li | |
| 4,141,585 A | 2/1979 | Blackman | |
| 4,259,896 A | 4/1981 | Hayashi et al. | |
| 4,413,857 A | 11/1983 | Hayashi | |
| 4,572,430 A | 2/1986 | Takagi et al. | |
| 4,679,411 A | 7/1987 | Pearse | |
| 4,685,727 A | 8/1987 | Cremer et al. | |
| 4,712,832 A | 12/1987 | Antolini et al. | |
| 4,729,598 A | 3/1988 | Hess | |
| 4,777,802 A | 10/1988 | Feher | |
| 4,847,933 A | 7/1989 | Bedford | |
| 4,853,992 A | 8/1989 | Yu | |
| 4,866,800 A | 9/1989 | Bedford | |
| 4,905,475 A | 3/1990 | Tuomi | |
| 4,923,248 A | 5/1990 | Feher | |
| 4,946,220 A | 8/1990 | Wyon et al. | |
| 4,981,324 A * | 1/1991 | Law | 297/180.11 |
| 4,997,230 A | 3/1991 | Spitalnick | |
| 5,002,336 A | 3/1991 | Feher | |
| 5,004,294 A | 4/1991 | Lin | |
| 5,016,302 A | 5/1991 | Yu | |
| 5,102,189 A | 4/1992 | Saito et al. | |
| 5,106,161 A | 4/1992 | Meiller | |
| 5,117,638 A | 6/1992 | Feher | |
| 5,138,851 A | 8/1992 | Mardikian | |
| 5,160,517 A | 11/1992 | Hicks et al. | |
| 5,211,697 A | 5/1993 | Kienlein et al. | |
| 5,226,188 A | 7/1993 | Liou | |
| 5,292,577 A | 3/1994 | Van Kerrebrouck et al. | |
| 5,354,117 A | 10/1994 | Danielson et al. | |
| 5,370,439 A | 12/1994 | Lowe et al. | |
| 5,372,402 A | 12/1994 | Kuo | |
| 5,382,075 A | 1/1995 | Shih | |
| 5,385,382 A | 1/1995 | Single, II et al. | |
| 5,403,065 A | 4/1995 | Callerio | |
| 5,408,711 A | 4/1995 | McClelland | |
| 5,411,318 A | 5/1995 | Law | |
| 5,416,935 A | 5/1995 | Nieh | |
| 5,450,894 A | 9/1995 | Inoue et al. | |
| 5,561,875 A | 10/1996 | Graebe | |
| 5,590,428 A | 1/1997 | Roter | |
| 5,597,200 A | 1/1997 | Gregory et al. | |
| 5,613,729 A | 3/1997 | Summer, Jr. | |
| 5,613,730 A | 3/1997 | Buie et al. | |
| 5,626,021 A | 5/1997 | Karunasiri et al. | |
| 5,626,386 A | 5/1997 | Lush | |
| 5,626,387 A | 5/1997 | Yeh | |
| 5,645,314 A | 7/1997 | Liou | |
| 5,692,952 A | 12/1997 | Chih-Hung | |
| 5,701,621 A | 12/1997 | Landi et al. | |
| 5,715,695 A | 2/1998 | Lord | |
| 5,787,534 A | 8/1998 | Hargest et al. | |
| 5,833,309 A | 11/1998 | Schmitz | |
| 5,833,321 A | 11/1998 | Kim et al. | |
| 5,887,304 A | 3/1999 | Von der Heyde | |
| 5,902,014 A | 5/1999 | Dinkel et al. | |
| 5,918,930 A | 7/1999 | Kawai et al. | |
| 5,921,100 A | 7/1999 | Yoshinori et al. | |
| 5,921,314 A | 7/1999 | Schuller et al. | |
| 5,921,858 A | 7/1999 | Kawai et al. | |
| 5,924,766 A * | 7/1999 | Esaki et al. | 297/180.13 |
| 5,924,767 A | 7/1999 | Pietryga | |
| 5,927,817 A | 7/1999 | Ekman et al. | |
| 5,934,748 A * | 8/1999 | Faust et al. | 297/180.12 |
| 6,003,950 A | 12/1999 | Larsson | |
| 6,019,420 A | 2/2000 | Faust et al. | |
| 6,048,024 A | 4/2000 | Wallman | |
| 6,059,018 A * | 5/2000 | Yoshinori et al. | 165/42 |
| 6,062,641 A | 5/2000 | Suzuki et al. | |
| 6,064,037 A | 5/2000 | Weiss et al. | |
| 6,079,485 A | 6/2000 | Esaki et al. | |
| 6,085,369 A | 7/2000 | Feher | |
| 6,105,667 A | 8/2000 | Yoshinori et al. | |
| 6,109,688 A | 8/2000 | Wurz et al. | |
| 6,124,577 A | 9/2000 | Fristedt | |
| 6,145,925 A | 11/2000 | Eksin et al. | |
| 6,179,706 B1 | 1/2001 | Yoshinori et al. | |
| 6,186,592 B1 | 2/2001 | Orizaris et al. | |
| 6,189,966 B1 | 2/2001 | Faust et al. | |
| 6,196,627 B1 | 3/2001 | Faust et al. | |
| 6,224,150 B1 | 5/2001 | Eksin et al. | |
| 6,263,530 B1 | 7/2001 | Feher | |
| 6,273,810 B1 * | 8/2001 | Rhodes et al. | 454/120 |
| 6,277,023 B1 | 8/2001 | Schwarz | |
| 6,278,090 B1 | 8/2001 | Fristedt et al. | |
| 6,291,803 B1 | 9/2001 | Fourrey | |
| 6,478,369 B1 | 11/2002 | Aoki et al. | |
| 6,481,801 B1 | 11/2002 | Schmale | |
| 6,491,578 B2 | 12/2002 | Yoshinori et al. | |
| 6,497,275 B1 | 12/2002 | Elliot | |
| 6,505,886 B2 * | 1/2003 | Gielda et al. | 297/180.13 |
| 6,511,125 B1 | 1/2003 | Gendron | |
| 6,541,737 B1 | 4/2003 | Eksin et al. | |
| 6,578,910 B2 | 6/2003 | Andersson et al. | |
| 6,592,181 B2 | 7/2003 | Stiller et al. | |
| 6,598,405 B2 | 7/2003 | Bell | |
| 6,604,785 B2 | 8/2003 | Bargheer et al. | |
| 6,619,736 B2 | 9/2003 | Stowe et al. | |
| 6,626,488 B2 | 9/2003 | Pfahler | |
| 6,629,724 B2 | 10/2003 | Ekern et al. | |
| 6,629,725 B1 | 10/2003 | Kunkel et al. | |
| 6,664,518 B2 | 12/2003 | Fristedt et al. | |
| 6,676,207 B2 * | 1/2004 | Rauh et al. | 297/180.14 |
| 6,682,140 B2 | 1/2004 | Minuth et al. | |
| 6,685,553 B2 | 2/2004 | Aoki | |
| 6,687,937 B2 | 2/2004 | Harker | |
| 6,719,534 B2 | 4/2004 | Aoki et al. | |
| 6,719,624 B2 | 4/2004 | Hayashi et al. | |
| 6,722,148 B2 | 4/2004 | Aoki et al. | |
| 6,761,399 B2 | 7/2004 | Bargheer et al. | |
| 6,767,621 B2 | 7/2004 | Flick et al. | |
| 6,786,541 B2 * | 9/2004 | Haupt et al. | 297/180.1 |
| 6,786,545 B2 | 9/2004 | Bargheer et al. | |
| 6,793,016 B2 * | 9/2004 | Aoki et al. | 165/202 |
| 6,808,230 B2 | 10/2004 | Buss et al. | |
| 6,817,675 B2 | 11/2004 | Buss et al. | |
| 6,826,792 B2 | 12/2004 | Lin | |
| 6,828,528 B2 | 12/2004 | Stowe et al. | |
| 6,848,742 B1 | 2/2005 | Aoki et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,871,696 B2 * | 3/2005 | Aoki et al. | 165/43 |
| 6,892,807 B2 | 5/2005 | Fristedt et al. | |
| 6,893,086 B2 | 5/2005 | Bajic et al. | |
| 6,929,322 B2 | 8/2005 | Aoki et al. | |
| 6,957,545 B2 | 10/2005 | Aoki | |
| 6,976,734 B2 | 12/2005 | Stoewe | |
| 7,013,653 B2 | 3/2006 | Kamiya et al. | |
| 7,028,493 B2 * | 4/2006 | Tomita et al. | 62/161 |
| 7,040,710 B2 | 5/2006 | White et al. | |
| 7,052,091 B2 * | 5/2006 | Bajic et al. | 297/452.43 |
| 7,070,232 B2 | 7/2006 | Minegishi et al. | |
| 7,083,227 B2 * | 8/2006 | Brennan et al. | 297/180.14 |

(56) References Cited

U.S. PATENT DOCUMENTS

| | | | |
|---|---|---|---|
| 7,114,771 B2 * | 10/2006 | Lofy et al. | 297/180.13 |
| 7,131,689 B2 | 11/2006 | Brennan et al. | |
| 7,147,279 B2 | 12/2006 | Bevan et al. | |
| 7,168,758 B2 | 1/2007 | Bevan et al. | |
| 7,201,441 B2 * | 4/2007 | Stoewe et al. | 297/180.14 |
| 7,275,983 B2 * | 10/2007 | Aoki et al. | 454/75 |
| 7,275,984 B2 * | 10/2007 | Aoki | 454/120 |
| 7,338,117 B2 | 3/2008 | Iqbal et al. | |
| 7,356,912 B2 | 4/2008 | Iqbal et al. | |
| 7,370,911 B2 | 5/2008 | Bajic et al. | |
| 7,478,869 B2 * | 1/2009 | Lazanja et al. | 297/180.14 |
| 7,621,135 B2 * | 11/2009 | Kadle et al. | 62/3.3 |
| 7,827,805 B2 | 11/2010 | Comiskey | |
| 7,828,050 B2 * | 11/2010 | Esaki | 165/202 |
| 2003/0214160 A1 * | 11/2003 | Brennan et al. | 297/180.14 |
| 2004/0195870 A1 | 10/2004 | Bohlender et al. | |
| 2005/0066505 A1 | 3/2005 | Iqbal et al. | |
| 2005/0067862 A1 | 3/2005 | Iqbal et al. | |
| 2005/0093347 A1 | 5/2005 | Bajic et al. | |
| 2005/0140189 A1 | 6/2005 | Bajic et al. | |
| 2005/0173950 A1 | 8/2005 | Bajic et al. | |
| 2005/0200179 A1 | 9/2005 | Bevan et al. | |
| 2006/0152044 A1 | 7/2006 | Bajic et al. | |
| 2006/0158011 A1 | 7/2006 | Marlovits et al. | |
| 2007/0001507 A1 | 1/2007 | Brennan et al. | |
| 2007/0176471 A1 | 8/2007 | Knoll | |
| 2007/0214800 A1 * | 9/2007 | Kadle et al. | 62/3.3 |
| 2009/0031742 A1 * | 2/2009 | Seo et al. | 62/244 |
| 2010/0240292 A1 | 9/2010 | Zhang | |

FOREIGN PATENT DOCUMENTS

| | | |
|---|---|---|
| DE | 10030708 | 1/2002 |
| DE | 10144839 | 3/2003 |
| EP | 0 730 720 | 7/2000 |
| EP | 1088696 | 9/2000 |
| FR | 2599683 | 6/1986 |
| JP | 61-199412 A | 12/1986 |
| JP | 1171509 | 7/1989 |
| JP | 5000623 A | 1/1993 |
| JP | 5277020 | 10/1993 |
| JP | 10044756 | 2/1998 |
| JP | 11-48772 A | 2/1999 |
| JP | 2000125990 | 2/2000 |
| JP | 2001071800 | 3/2001 |
| JP | 2002125801 | 5/2002 |
| JP | 2002/125801 A | 8/2002 |
| JP | 2002234332 | 8/2002 |
| JP | 2004224108 | 8/2004 |
| KR | 10-2006-0107298 A | 10/2006 |
| SE | 202556 | 3/1966 |
| WO | 96/05475 | 2/1996 |
| WO | 97/09908 | 3/1997 |
| WO | 03/051666 | 3/2003 |
| WO | 03/077710 | 9/2003 |
| WO | 03/101777 | 12/2003 |
| WO | 2004/028857 | 4/2004 |
| WO | 2004/078517 | 9/2004 |
| WO | 2004/082989 | 9/2004 |
| WO | 2005/021320 | 3/2005 |
| WO | 2005/035305 | 4/2005 |
| WO | 2005/042301 | 5/2005 |
| WO | 2005/047056 | 5/2005 |
| WO | 2005/068253 | 7/2005 |
| WO | 2005/087880 A1 | 9/2005 |
| WO | 2005/110806 | 11/2005 |

OTHER PUBLICATIONS

Lexus LS430 Conditioned Seat, Pictures of prior products.
Cadillac XLR Conditioned Seat, Pictures of prior products.
International Search Report dated Apr. 27, 2009, International Application No. PCT/US2008/085344.

* cited by examiner

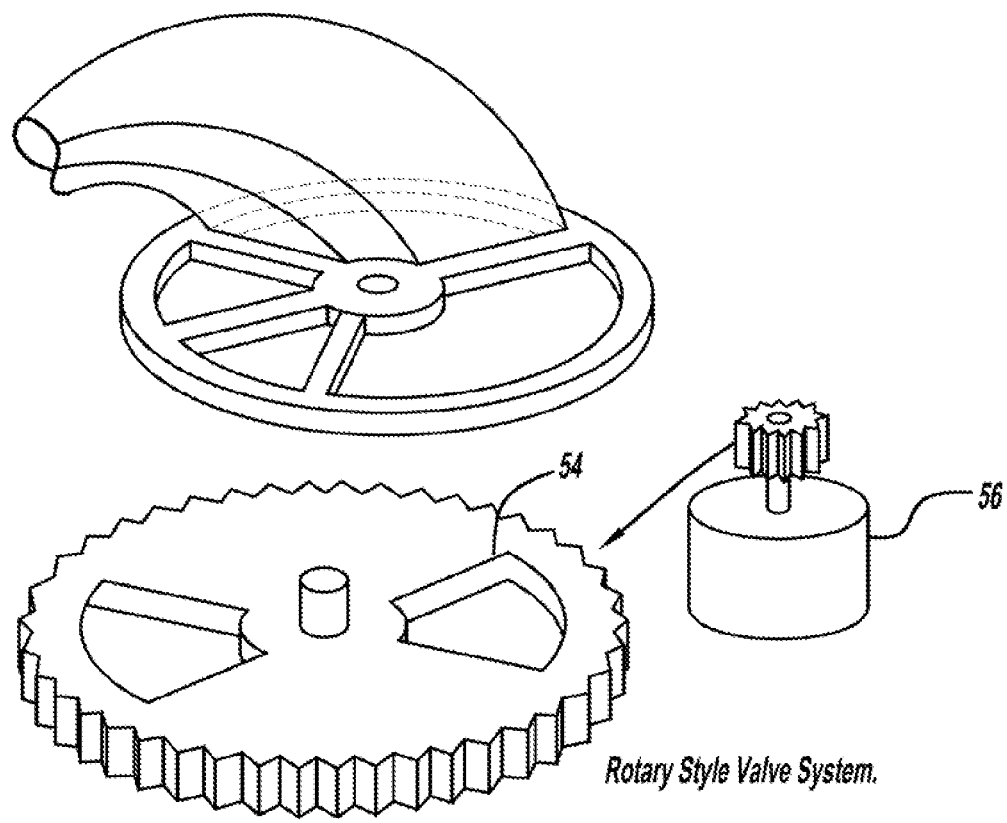
Rotary Style Valve System.
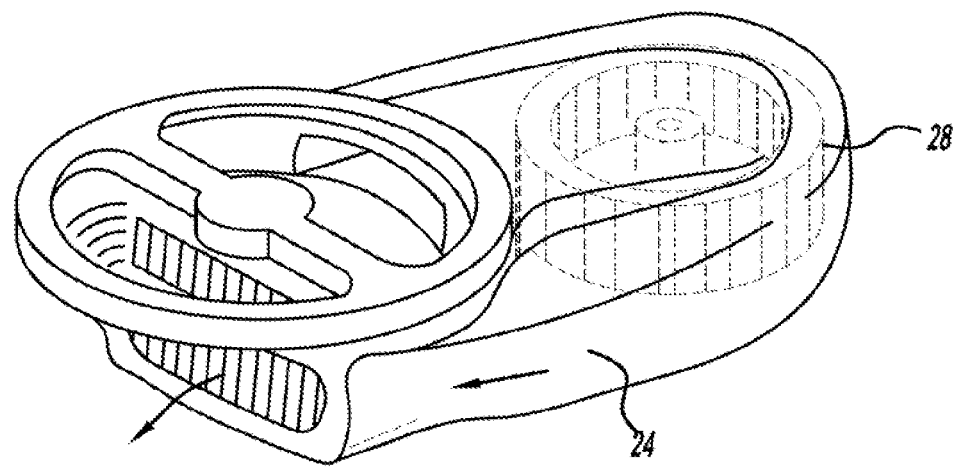
FIG - 21 ical aspect according to the present invention.

SEAT CONDITIONING MODULE AND METHOD

CLAIM OF PRIORITY

The present application claims the benefit of the filing date of U.S. Provisional Application Ser. No. 61/012,616; filed: Dec. 10, 2007, hereby incorporated by reference.

FIELD OF THE INVENTION

The present invention relates to an apparatus and method of conditioning a vehicle seat, more particularly to provide an apparatus and method of conditioning a vehicle seat via a seat conditioning module using at least one set of movable valves to communicate through an air distribution system to a surface of an automotive seat enabling any number of conditioning modes.

BACKGROUND OF THE INVENTION

It is well known that vehicles are being equipped with a variety of features to enhance the comfort of its occupants, particularly features such as ventilated, heated and/or cooled seats (e.g. seat conditioning modules). These seat conditioning modules can add cost and complexity to the seats and to the assembly of these seats. It is desirous to design a seat conditioning module so that any number of conditioning modes (e.g. pulling ambient air, pushing ambient air, pushing conditioned air, direct thermal heating via resistance heating, or any combination thereof) while minimizing the number of components of the seat conditioning module. To this end, the present invention seeks to improve on the current state of the art by the use of a unique fluid control system and conditioning module design to control and enhance the conditioning modes for the occupant.

SUMMARY OF THE INVENTION

The present invention is an improved seat conditioning module and method of using the unique seat conditioning module to enhance the conditioning environment and modes for the occupant.

Accordingly, pursuant to one aspect of the present invention, there is contemplated a seat conditioning module for a seat conditioning assembly that may comprise an air mover for moving a fluid and that may be fluidly connected to at least one intake port, at least one outtake port, or both wherein the intake port and the outtake port can be in fluid communication with a conditioned area via a distribution channel; a valve assembly with at least two apertures that may be movably disposed between the air mover and the at least one intake and at least one outtake ports for controlling the movement of the fluid between the at least one intake and at least one outtake ports and the conditioned area; at least one actuation device that may move the valve assembly to control the passage of the fluid through the at least two apertures or ports; an optional conditioning device in fluid communication with the air mover and the conditioned area; and a control device that may at least control the position of the at least two apertures of the valve assembly, activation of the optional conditioning device, the operation of the air mover, or any combination thereof.

The invention may be further characterized by one or any combination of the features described herein, such as the optional conditioning device may be a thermoelectric device for heating, cooling or both the fluid. The seat conditioning assembly may include a separate heater device disposed within 25 mm of a seat surface. The optional conditioning device may include at least one thermal collection device for storing thermal energy. The seat conditioning module may further include a venting system disposed adjacent to the seat surface for fluidly communicating air from the seat conditioning module to an area of a seat occupant, from the area of the seat occupant, or both. The venting system may include a thermal conditioning device disposed between the seat conditioning module and a vent aperture located adjacent to the seating surface. The air mover may be disposed in an air-impermeable housing that defines a hollow chamber which may include at least one opening which the valve assembly is disposed upon and may be fluidly connected to the at least one input and at least one output ports, wherein at least one of the ports may be defined by a air-impermeable hollow tubular structure.

Accordingly, pursuant to another aspect of the present invention, there is contemplated a method conditioning a vehicle seat, including the steps of (a) providing a seat conditioning assembly including a seat conditioning module and a distribution channel, wherein the seat conditioning module may include an air mover, a valve system that may include at least two movable apertures disposed between at least one input port and at least one output port and may be fluidly connected to the distribution channel, wherein the distribution channel may be fluidly connected to a conditioned area of the vehicle seat; (h) providing an optional conditioning device that may include a thermal collection device disposed within the seat conditioning module and in fluid communication with the air mover; (c) moving the at least two apertures of the valve system such that it may allow air flow between the seat conditioning module and the distribution channel; and activating the air mover such that it may fluidly communicate air to the conditioned area, from the conditioned area, or both through the valve system for conditioning the vehicle seat.

The invention may be further characterized by one or any combination of the features described herein, such as further including the conditioning device represented by a heat pump having main and waste side (of Peltier, Stirling, or traditional two phase compression heat pump principles). The valve system may be adapted to block a flow through a main side and thus create a condition for collecting thermal energy or cold in the heat pump main side for following release it towards the conditioned area when the main side flow is open. Including the step of releasing the collected thermal energy or cold in a burst to the conditioned area

BRIEF DESCRIPTION OF THE DRAWINGS

FIG. 21 illustrates an exploded perspective view of an exemplary aspect according to the present invention.

DETAILED DESCRIPTION

Figure 1:
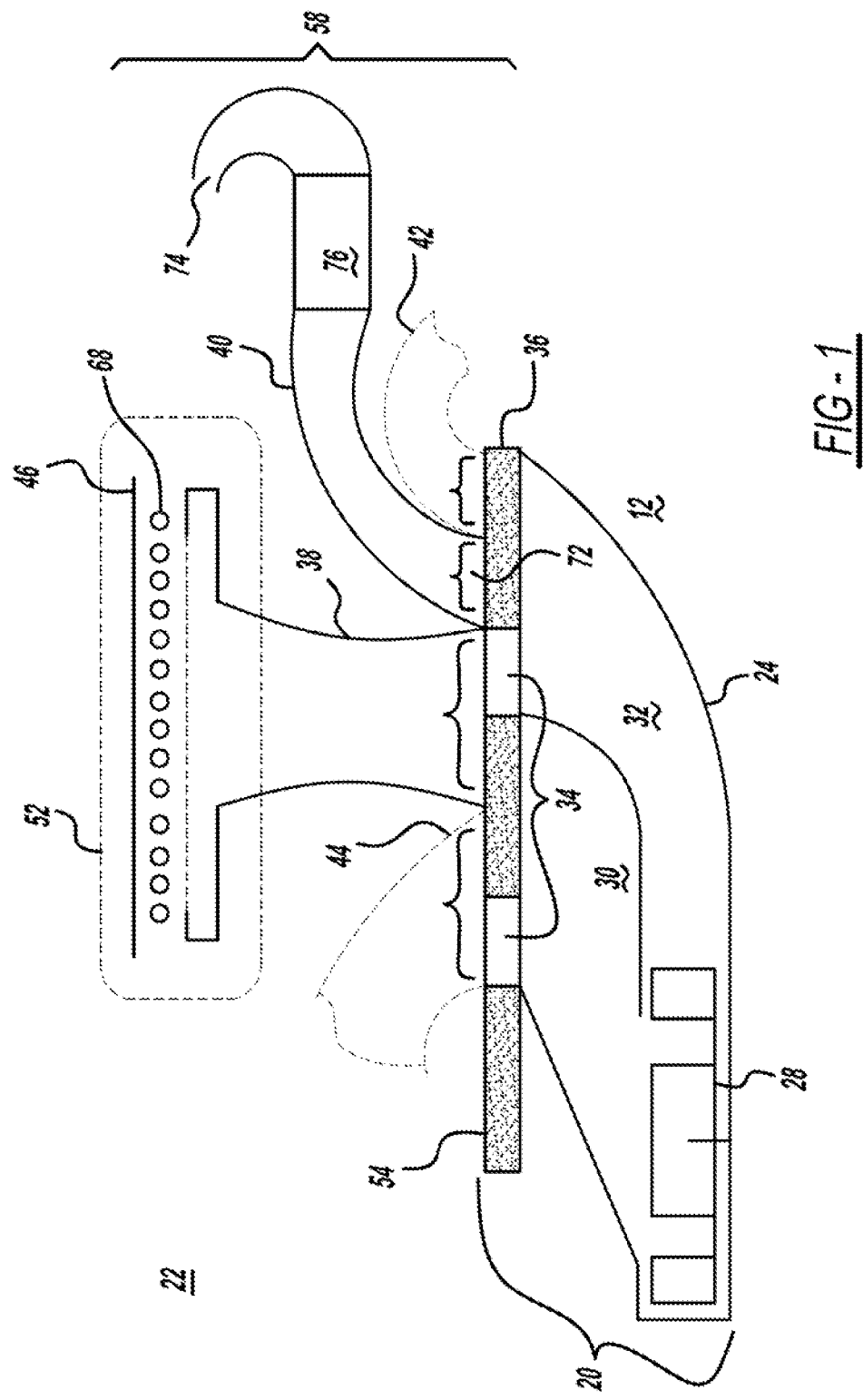
FIG. 1 illustrates a schematic side view of an exemplary aspect according to the present invention.

As illustratively depicted in FIGS. 1-28, the present invention is directed at an improved seat conditioning module 20 and method for providing an improved conditioning effect for a conditioned area 52 of an automotive seat. For all figures, arrows depict an air flow and air flow direction.

In general, one aspect of the present invention contemplates an improved seat conditioning module 20 for use in a seat conditioning assembly 22 of a vehicle seat. The seat conditioning module 20 may include an air-impermeable housing 24 that defines a hollow chamber with an air mover 28 that essentially splits the chamber into two parts, a pull line 30 and a push line 32. The pull line 30 being located on the intake side of the air mover 28 and the push line being located on the output side of the air mover 28. It is also contemplated that the housing 24 may be partially or fully air permeable, but preferably is substantially air-impermeable. The housing 24 may also contain openings for other components (e.g. openings for wires, assembly tooling, motor cooling flow, spare holes for screws, condensed water drainage, etc.) It should be noted that for purposes of the present invention described below, it is assumed that the air mover 28 motivates the fluid in one direction (e.g. pull line to push line), although it is contemplated that the air mover function could be reversible.

The fluid preferably enters and exits the seat conditioning module 20, into and out from the pull line 30 and the push line 32 respectively, through at least two or more ports 34 in a controllable valve system 36. From these ports 34, air can be fluidly connected to and travel to and/or from a distribution channel(s) 58 including distribution system(s) 38 within the seat, a ventilation duct(s) 40, an exhaust port(s) 42, an intake port(s) 44, back into the module, or any combination thereof, which are further described below. All of these ports 34 could be a variety of shapes and/or sizes, so long as they are sufficiently large to allow enough fluid to pass therebetween to effectively provide the desired conditioning effect to the seat surface 46. It is also contemplated that it may desirous to include fluid passageways that are not part of the controllable valve system 36 (e.g. open holes or mechanically independent valves in the module wall, not shown) to allow air or other fluids to flow in or out of the module.

The seat conditioning module 20 may also contain (within or spaced apart from) a control mechanism or device (not shown). This control device may control (e.g. switch on, off) and/or provide various power levels to part or all of the functions of the module (e.g. air mover, valve system, additional conditioning devices, conditioning modes, etc. . . . ). This control device may include a memory function that stores pre-programmed functional information that allows it to control the different "modes" described in further detail below.

In another aspect of the present invention it is contemplated the improved seat conditioning module 20 as described above also may include a thermal conditioning device 48 (e.g. a thermoelectric heating/cooling unit or "TED", an interface to the vehicle environmental control unit-"HVAC", a heat pump, or the like). When the thermal conditioning device 48 is integral to the module (e.g. located within the hollow chamber), it is preferably located within the push line 32 area of the module. If the thermal conditioning device 48 is remote (e.g. in the case of the HVAC) from the module, then it may be preferably fluidly connected to the module on the pull line 30 side. The inclusion of such a thermal conditioning device 48 may help with the goal of the present invention of improved occupant comfort by allowing the seat conditioning module 20 to provide heated or cooled air.

In yet another aspect of the present invention it is contemplated that the improved seat conditioning module 20 that includes the thermal conditioning device 48 may also include a thermal energy collection device 50, and optionally a thermo-insulation layer 55. This collection device may serve to collect and store thermal energy for use in what may be described as a "burst" mode. This "burst" mode may serve to provide a relatively short (e.g. several seconds to several minutes) burst of additional thermal conditioning (e.g. thermal energy or cold) to the conditioning area 52 about the seat surface 46.

Figure 25:
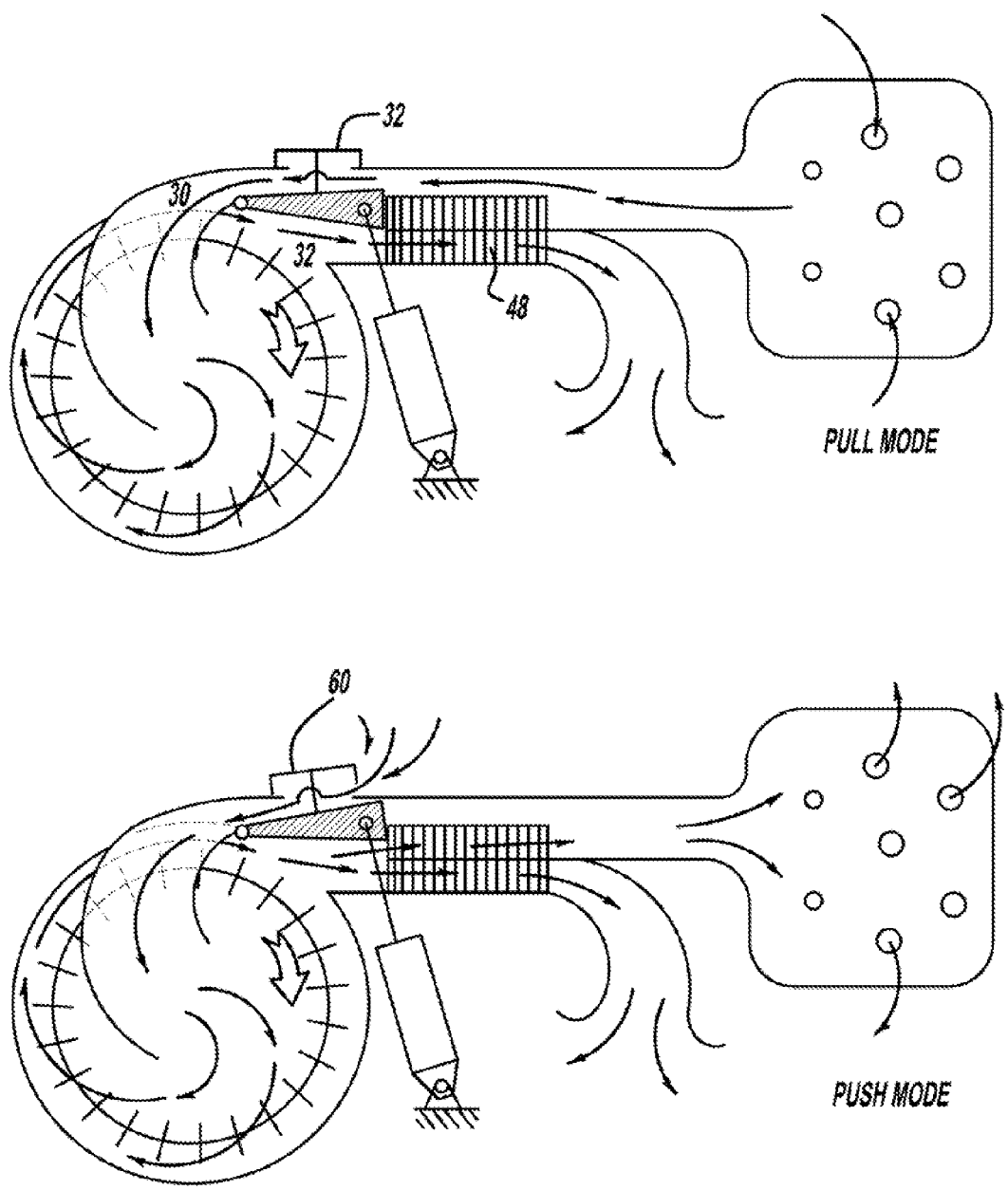
FIG. 25 illustrates a top and perspective view of an exemplary aspect according to the present invention.
Figure 26:
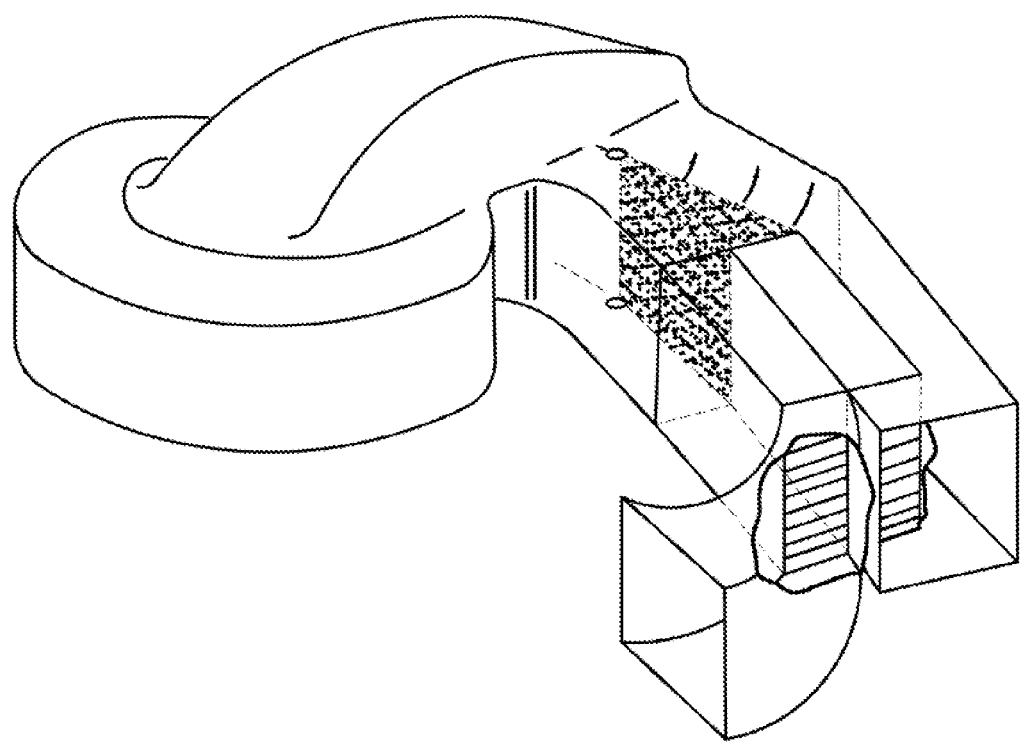
FIG. 26 illustrates a schematic side view of an exemplary aspect according to the present invention.
Figure 27:
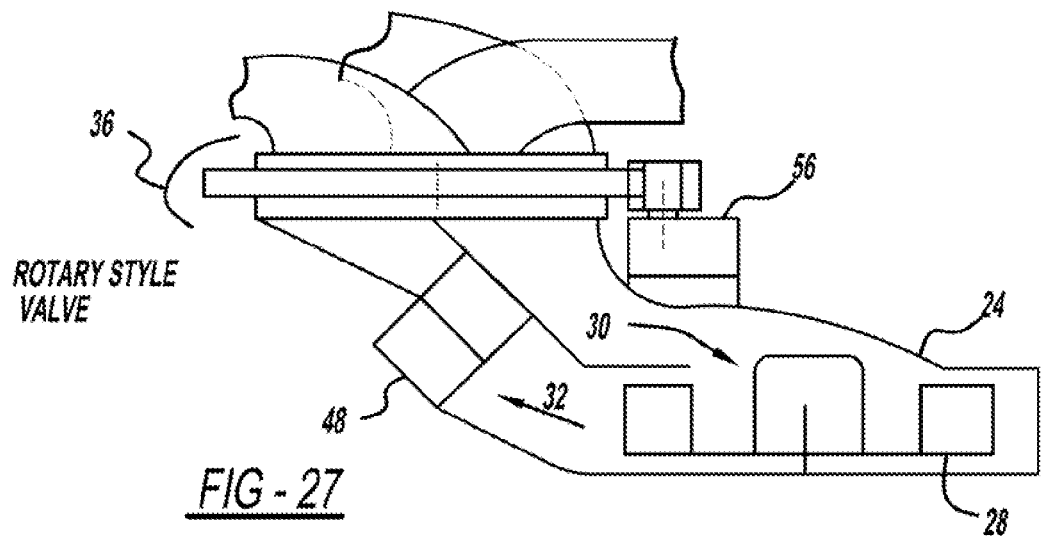
FIG. 27 illustrates a schematic side view of an exemplary aspect according to the present invention.
Figure 28:
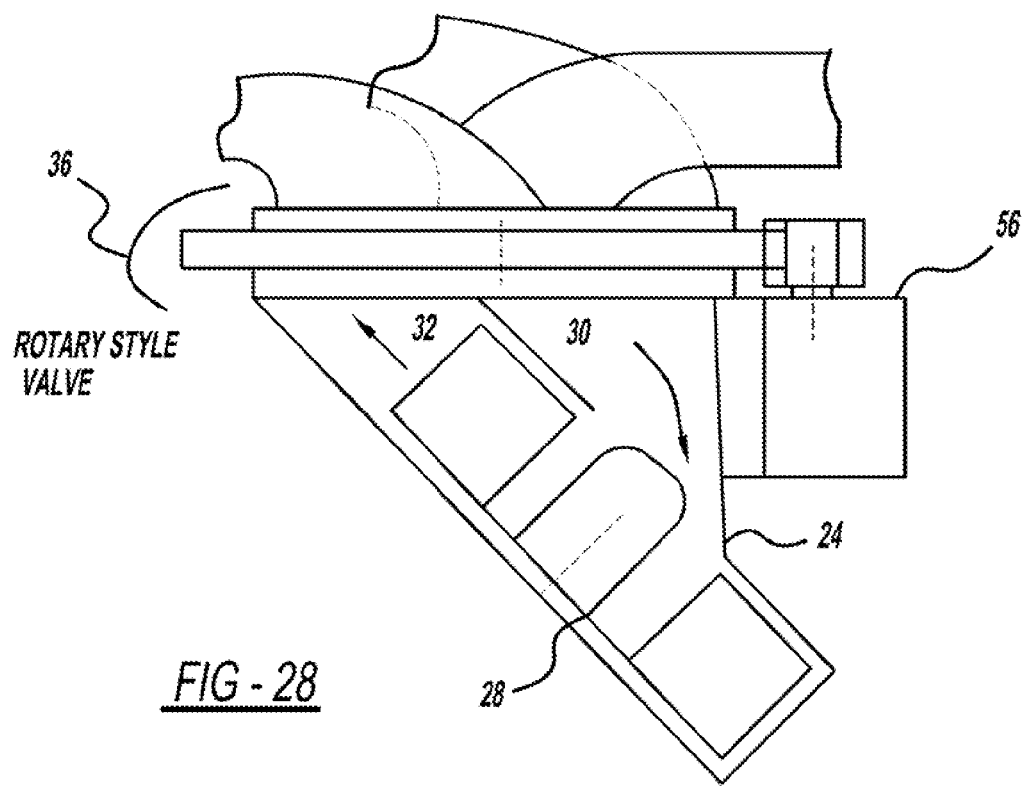
FIG. 28 illustrates a schematic side view of an exemplary aspect according to the present invention.

General illustrative examples of packaging of the system are shown in FIGS. 25-27.

Valve System 36

Figure 22:
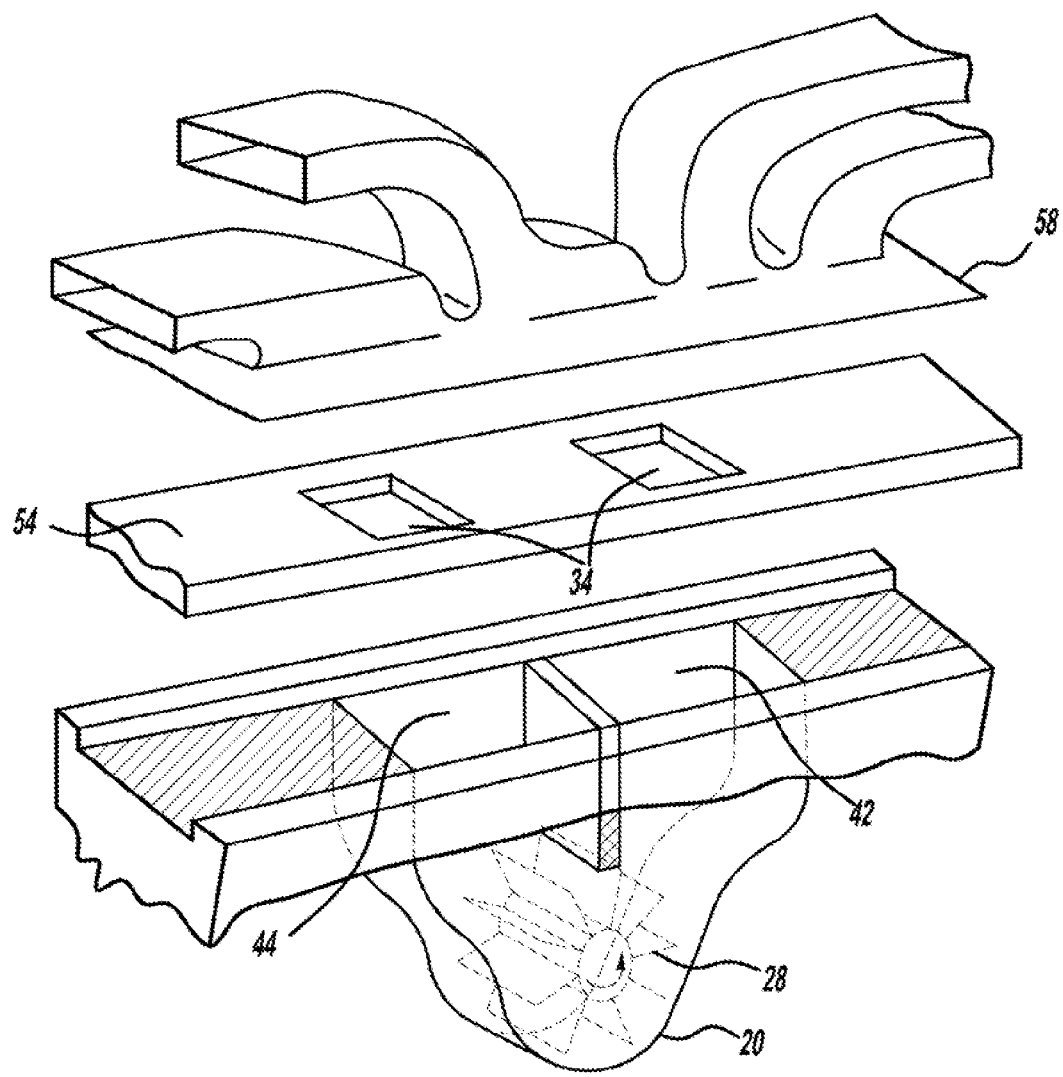
FIG. 22 illustrates an exploded perspective view of an exemplary aspect according to the present invention.
Figure 23:
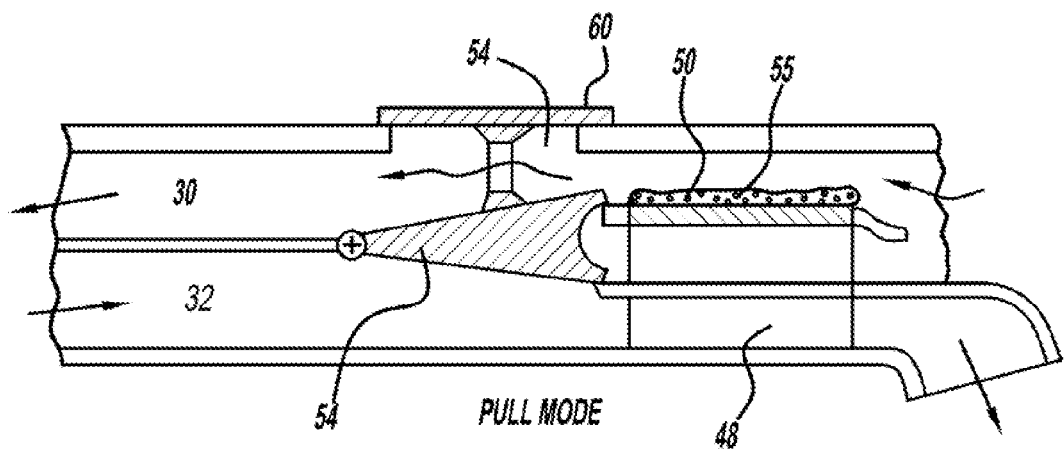
FIG. 23 illustrates a side view of an exemplary aspect according to the present invention.
Figure 24:
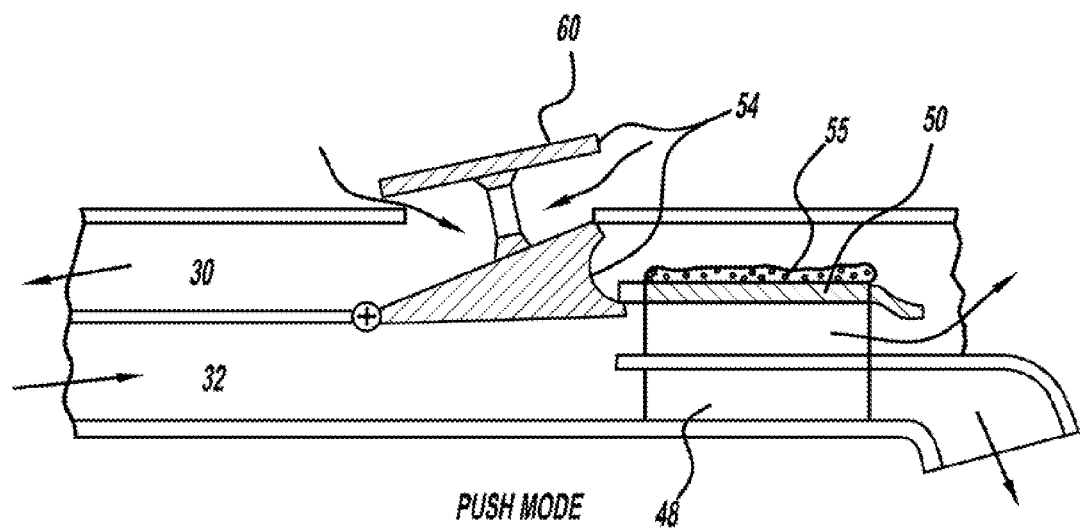
FIG. 24 illustrates a side view of an exemplary aspect according to the present invention.

For purposes of the present invention, the valve system 36 may be described as a substantially air-impermeable layer or layers 54 (e.g. a metal or plastic plate) with a number (e.g. two or more) of through-holes, apertures, or ports 34 that functions to control most, if not all, of the fluid flow to and from the seat conditioning module 20. It is contemplated that the function of the valve system 36 may be accomplished in a number of structural configurations. For example, the valve system 36 could include a plate member or members (air-impermeable layer 54) with a series of apertures (ports 34) that either moves in a linear or rotational motion by use of an actuation means 56 (e.g. electric motor, pneumatically, hydraulically, or the like). It also may include cylindrical, conical or spherical shape or of any other axis-symmetrical shape with apertures in it. Or a slider of trapezoidal crosssection moving for example in curved tunnel, for example in spiral channel. Or a belt and drag through curved slot-shaped tunnel. Also the spheroid segment may be moving in polar coordinates and not along the same route. The motion may be used as a means for positioning the apertures over the desired part of the pull line 30 and push line 32 and the corresponding distribution channel 58 (e.g. the distribution system(s) 38 within the seat, the ventilation duct(s) 40, the exhaust port(s) 42, the intake port(s) 44, etc. . . . ). In another example, the valve system 36 may be structured as a moveable flap 60 or series of flaps, again allowing fluid to flow between the module and the desired distribution channel 58. Examples of some of the various valve systems described above are shown in FIGS. 21-24. In particular. FIG. 21 shows an exemplary rotary style vent. FIG. 22 shows an exemplary linear valve system. FIGS. 23-24 show an exemplary flap style valve system. It is further contemplated that the valves, particularly in the case of flap 60 type of valve, may be mechanically linked, independently actuated, or any combination thereof.

It is contemplated that the valve system 36 could utilize either of the above described structures or any combination thereof, or any fluid control structure that serves the same or similar function. The valve assembly movable element with apertures (or assembly itself) may be done of variety of shapes able to maintain sufficiently fluid-tight interface with structures (ducts) delivering fluid media to/from the conditioning device.

Control Device (not Shown)

For purposes of the present invention, the control device (not shown) may be described as a device or mechanism that functions to control and/or power the functionality and/or the components of the seat conditioning module 20. For example, this may be accomplished by the use of a programmable electronic control module. The control module may be activated automatically or manually where it essentially instructs (e.g. via electrical signals) the components of the seat conditioning to activate. For example, the control module may instruct the air mover to motivate the air in a specific direction, instruct the thermal conditioning device 48 to activate, instruct the valve system 36 to open a desired port 34, or any combination of these actions or more.

Thermal Conditioning Device 48

Figure 19:
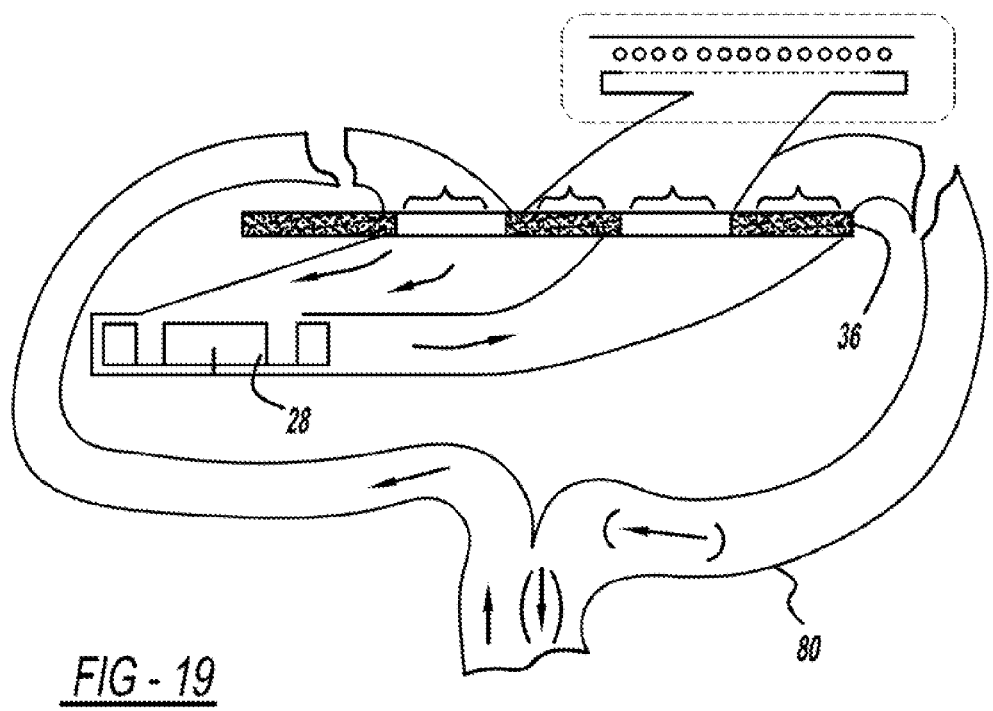
FIG. 19 illustrates a schematic side view of an exemplar aspect according to the present invention.
Figure 20:
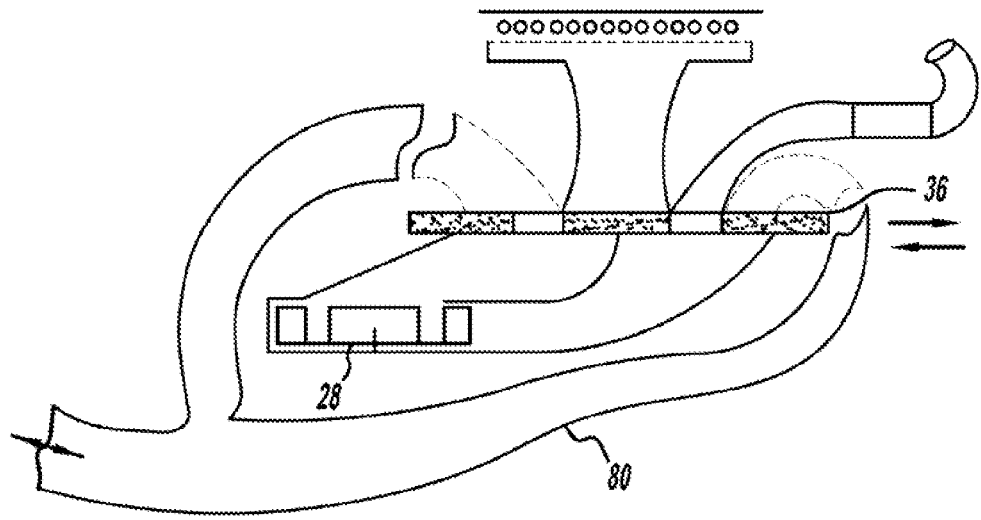
FIG. 20 illustrates a schematic side view of an exemplary aspect according to the present invention.

For purposes of the present invention, the thermal conditioning device 48 may be described as a device that changes the thermal energy of the fluid environment (e.g. heating or cooling). Illustrative examples include a TED unit 64, a HVAC unit of a vehicle (not shown), heat pumps (not shown), resistance heaters (not shown), or the like. An example of a seat conditioning module 20 that may utilize the HVAC unit of a vehicle is shown in FIGS. 19 and 20. In this example the intake port 44 and one possible output port 70 are fluidly connected to the HVAC unit via a ducting system 66. Additionally, a separate heater device 68 (e.g. an electrical resistance heater) may be located preferably within about 35 mm of the seat surface 46, more preferably with about 25 mm or less of the seating surface 46. This may aid the functionality of the total system by providing all or part of the heating of the seat surface 46 that may be desired Thermal Energy Collection Device 50

For purposes of the present invention, the thermal energy collection device 50 may be described as a device that takes the thermal energy from the thermal conditioning device and stores such energy for future use. For example, this may be accomplished by the use of a mass of thermally conductive materials (e.g. metal, plastic, liquids, gases, phase change materials may also be applied or the like) that is disposed either on, in the vicinity of, or both of the thermal conditioning device 48. It may be massive body in thermal connection with the heat pump main side heat sink or the sink itself may be made heavier than normal. Any sink has this functionality but normally sinks are light and not designed to collect the energy. In one example, the thermal energy collection device 50 may be a steel plate brought to connection to the heat sink (attached via thermal conductive paste). Aluminum, copper, steel are examples of suitable materials, but other may be applied as well.

Distribution System 38

For purposes of the present invention, the distribution system 36 may be described as any system or method (e.g. manifold(s), spacer layer(s) or the like) for communicating fluid (e.g. air) to and/or from the seating surface (e.g. through an air-permeable trim layer). Such distribution systems 38, at least as they exist internal to the seat and located above the seat conditioning module 20, are taught and described in U.S. Pat. Nos. 6,786,541; 7,052,091; 7,083,227; and 7,114,771. These references all incorporated hereto by reference for the express purpose of describing an article or method of communicating a fluid from the improved seat conditioning module 20 to and/or from the seat surface 46.

In one example of such a distribution system, as described in U.S. Pat. No. 6,786,541; the distribution system involves a pad assembly for a ventilated seat. The pad assembly includes a cushion member having an insert member of higher density foam providing an air distribution plenum. A channel whose open top is closed by a high density foam cover forms the plenum in the higher density insert member. The covering member is preferably molded as an integral part of the insert member. A trim layer would ordinarily cover the cushion, including the insert and insert channel cover. An open-celled foam layer could be used between the decorative trim layer and the cushion, including the insert and insert channel cover, to facilitate lateral air distribution to or from the cushion plenum while the seat is occupied.

In a second example of such a distribution system, as described in U.S. Pat. No. 7,083,227; the distribution system includes an insert located beneath the trim surface of each ventilated component. The insert includes a first layer having a heater integrated therein and a second layer formed of spacer material wherein the second layer defines an open space. A tubular structure is preferably provided in the system for providing the fluid communication between the insert and the fluid mover.

Ventilation Duct 40

For purposes of the present invention, the ventilation duct 40 may be described as a hollow channel member (e.g. a tube, conduit, air plenum, or the like) constructed of at least a semi-ridged material. The duct 40 may also be flexible or hinged and locationally adjustable (e.g. allowing a user to change the direction of the air flow). The duct 40 may be fluidly connected to the seat conditioning module 20 via an aperture 72 located at a lower duct end portion.

The duct may be fluidly connected to the seat occupant area via a nozzle aperture 74 or set of apertures in an upper duct end portion. The nozzle aperture 74 is preferably located within at least about 100 mm of the seat surface 46, more preferably with about 75 mm, and most preferably within about 25 mm or less. It is contemplated that the nozzle apertures may be located such that any air output is directed at any number or combinations of occupant locations (e.g. occupant's head, shoulders, neck, feet, arms, etc.), it is also contemplated that the nozzle apertures 74 could be flush with or sit in a local depression on the seat surface. It is contemplated that nozzle apertures 74 can be any number of shapes and sizes ranging pin hole like structures of less than about 0.01 mm in diameter to round, square, triangular holes 10 mm across or more. The nozzle aperture 74 could also be covered in an air permeable fabric, screen, or filter material.

It is also contemplated that any ventilation duct 40 may also contain a thermal conditioning device 76 within, about the walls of the hollow channel member, or even located adjacent to the nozzle apertures 74. It is contemplated that this thermal conditioning device 76 may be similar in type to that of the above described thermal conditioning device 48. Also, it could be a heat exchanger, heated or cooled by a liquid carrier supplied from another centralized thermal management system. This thermal conditioning device 76 could help provide additional warming or cooling to the seat surface 46 or any area that the ventilation duct 40 air output could reach.

Exhaust Port 42

For purposes of the present invention, the exhaust port 42 may be described as a port or aperture that serves as an exit point for fluid from the seat conditioning module 20 that may not necessarily be directed to the seat surface 46 (e.g. directed remotely via a manifold system 80). For example, when a thermoelectric heating/cooling unit (TED unit 64) is utilized by the present invention, the exhaust port 42 may be utilized as an exit point for the heated or cooled air from what is commonly known as the waste side of the TED.

Intake Port 44

For purposes of the present invention, the intake port 44 may be described as a port or aperture that serves as one possible entry point for fluid from the environment external to the seat conditioning module 20, via the valve system 36. In other words, the intake port 44 may be located above the valve system, on the pull line 30 side of the seat conditioning module 20 and through which fluid is supplied to the air mover 28. It is also contemplated that this port may be ducted via a manifold system 80 such that it may be possible to be at least partial fluid communication with the vehicle HVAC system or at least have the air taken in remotely from the module.

Operation of the Seat Conditioning Module

The present invention contemplates that the seat conditioning unit may operate in a number of "modes". These modes, which are detailed in the illustrative examples below and shown in FIGS. 1-20, can be described as "Push Mode" (into the seat), "Push Mode" (with partial Nozzle flow), "Nozzle Flow Only", "Push-Pull Mode", and "Pull Mode". A summary schematic view of the various functions described above is shown in FIG. 16.

Of note, each of these modes could be utilized with or without the optional thermal conditioning devices 48 and 76 and/or thermal energy collection device 50. Additionally, unless the particular mode calls for the use of the nozzles 74 of the vent ducts 40, inclusion of the ventilation ducts 40 may be entirely optional.

Additionally, several valve types (e.g. flap type, slide plates, or rotational plates) are shown in the exemplary figures and are not intended to limit the mode functionality, but are shown as examples of alternative valve styles.

"Push Mode"

Push mode is generally where the air mover pushes significantly all of air from the conditioning system to the seat surface 46 through the distribution system 38. Illustrative examples are seen in FIGS. 1-12 and described in more detail below. Arrows depict the direction of air flow.

Figure 2:
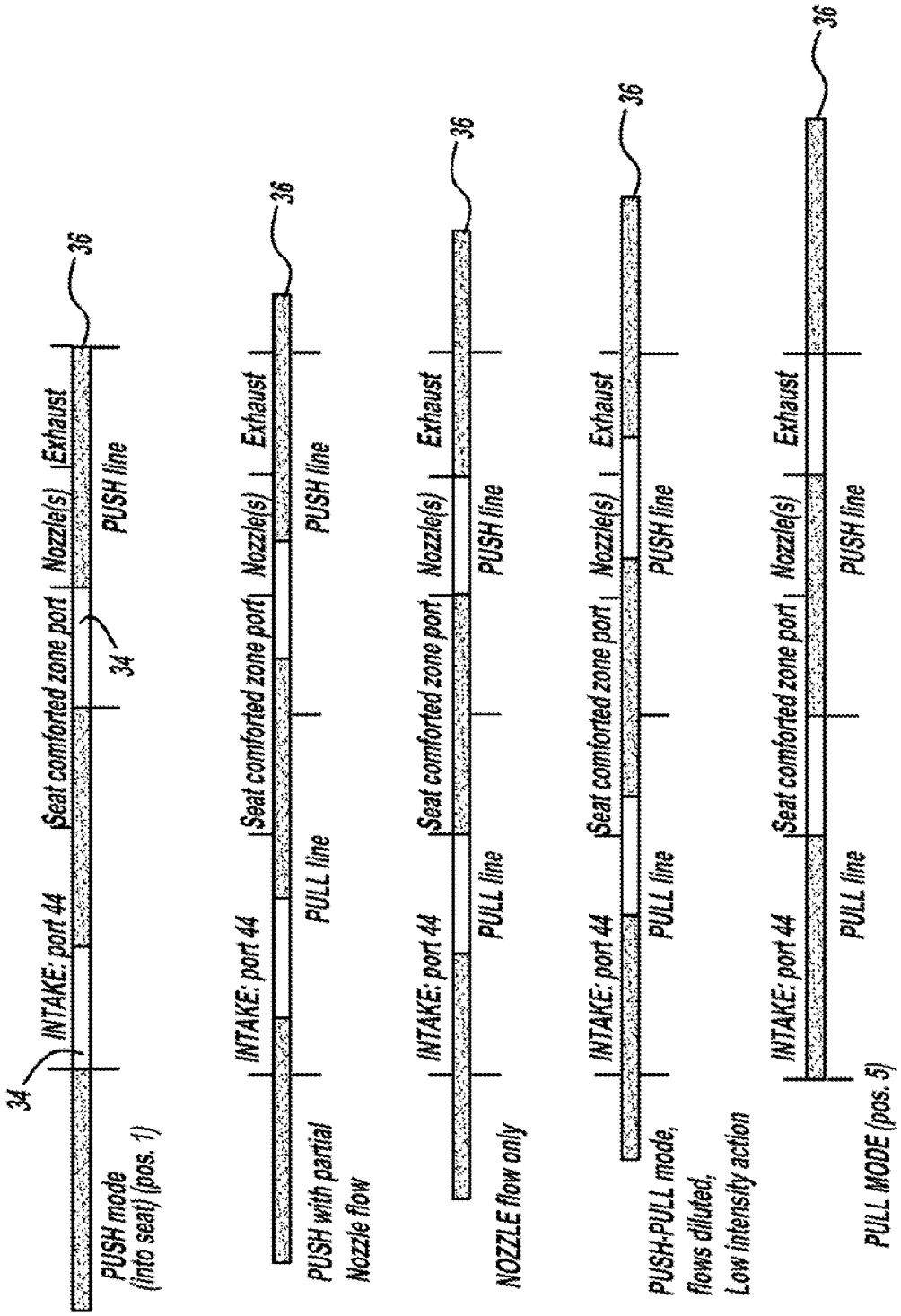
FIG. 2 illustrates a series of schematic valve opening positions according to one aspect of the present invention.
Figure 3:
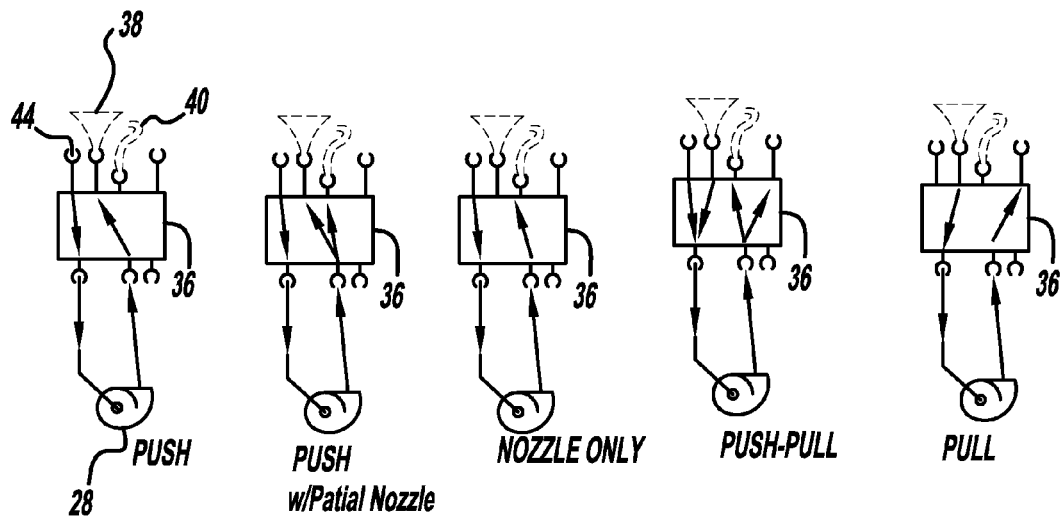
FIG. 3 illustrates a series of schematic top views of an exemplary aspect according to the present invention.

Various illustrative schematic views of the push mode, with the optional vent system and without a conditioning device 48, are shown in FIGS. 1-2. The air mover is activated in such a manner as to motivate substantially all of the air towards the seat surface 46 via the distribution system 38. FIGS. 1, 3 show schematic views of the push mode. FIG. 3 shows a schematic view of the valve opening (e.g. port 34) positions.

Figure 4:
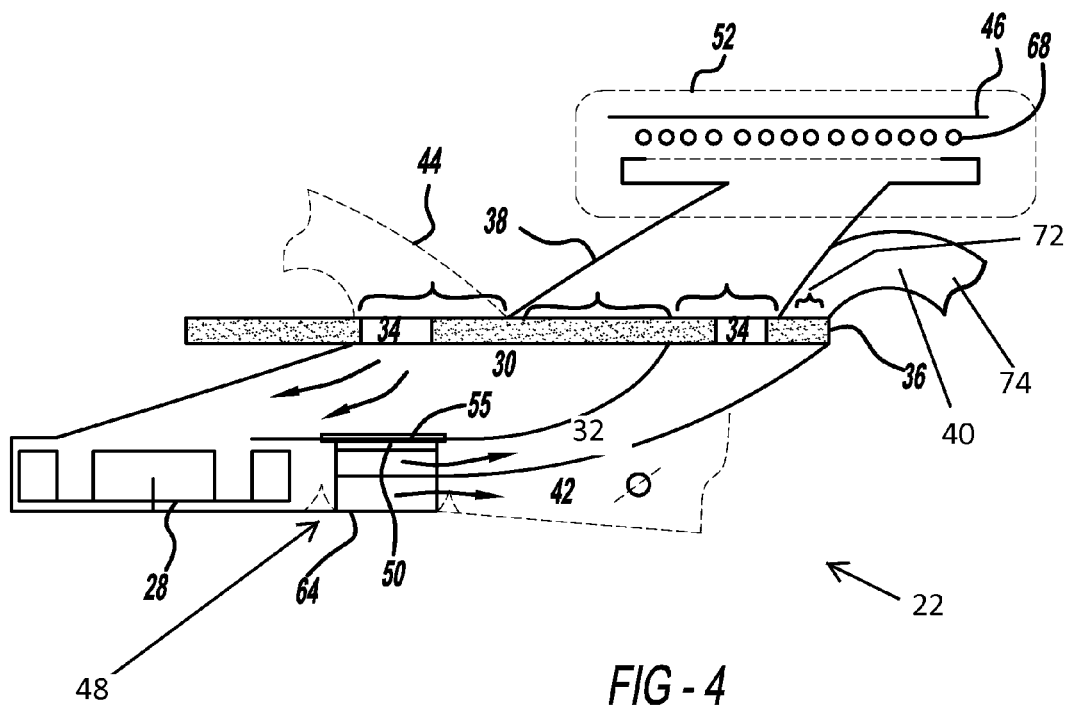
FIG. 4 illustrates a schematic side view of an exemplary aspect according to the present invention.
Figure 5:
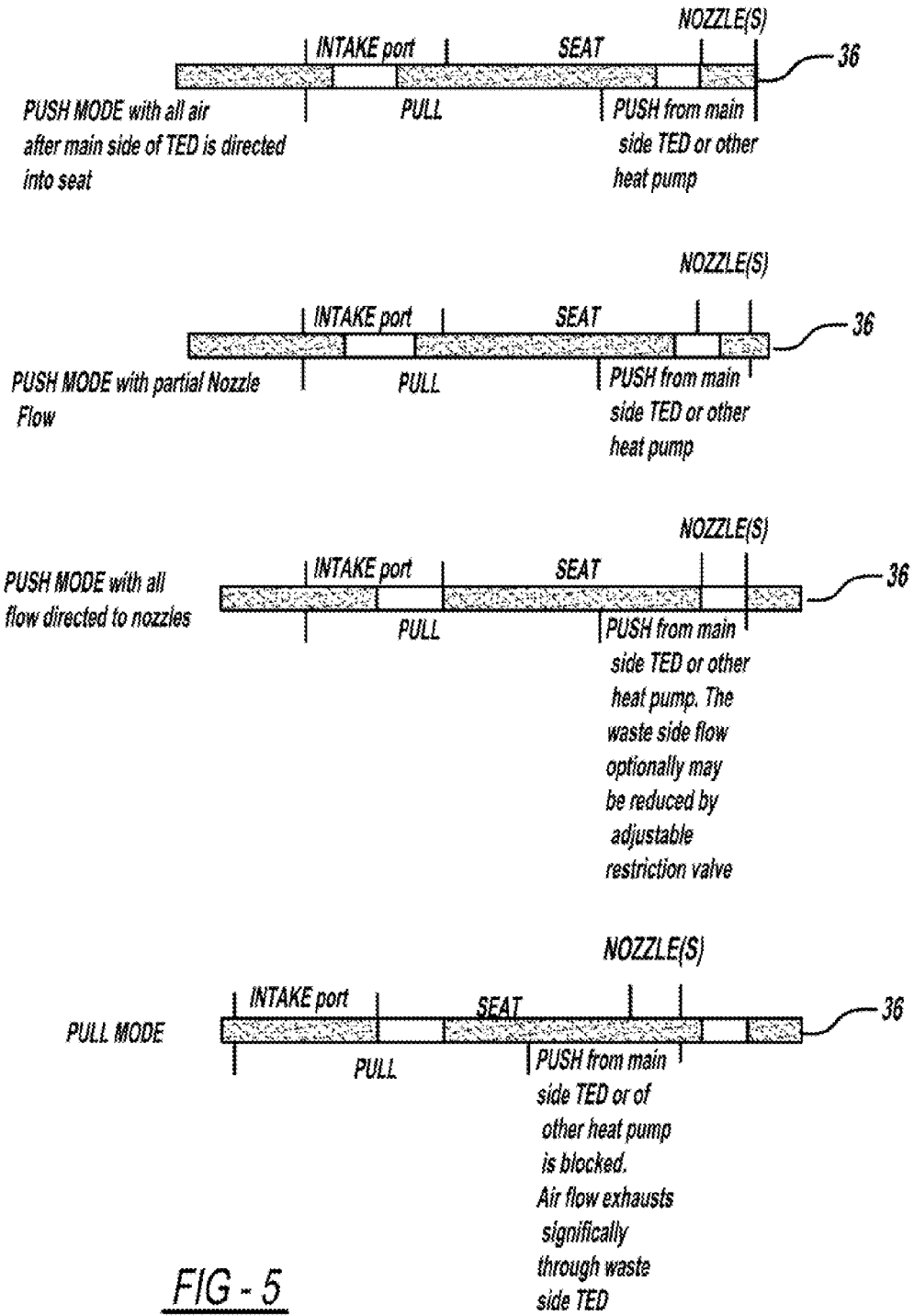
FIG. 5 illustrates a schematic valve opening positions according to the present invention.
Figure 6:
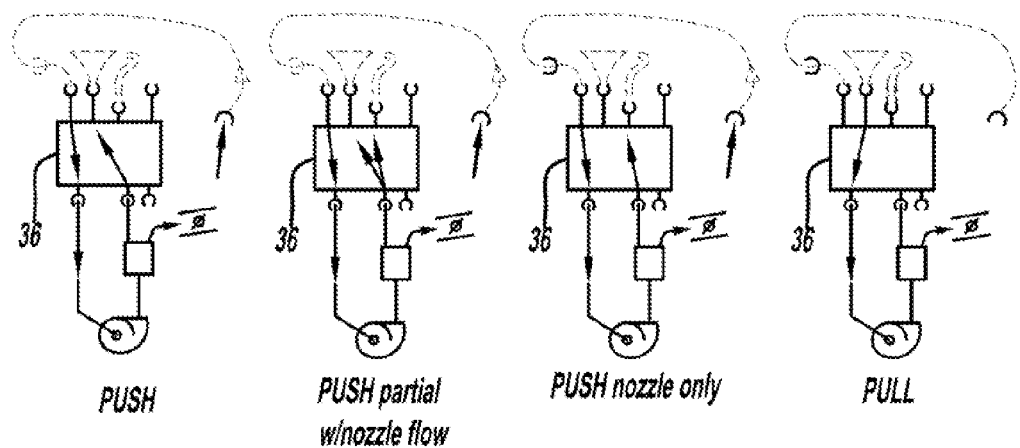
FIG. 6 illustrates a series of schematic top views according to another aspect of the present invention.

In another illustrative example, as seen in FIGS. 4-6, an exemplary thermal conditioning device 48, an exemplary thermal energy collection device 50, and an exhaust port 42 are shown and utilized in the seat conditioning module 20. This example is similar to the above one with some exceptions. The first is that some of the fluid exits the system via the exhaust port 42. Second, any stored thermal energy in the thermal energy collection device 50 would be transferred to the fluid flow going to the conditioning area 52 as in the "burst" mode as described previously. FIG. 5 shows a schematic view of the valve opening (e.g. port 34) positions.

Figure 7:
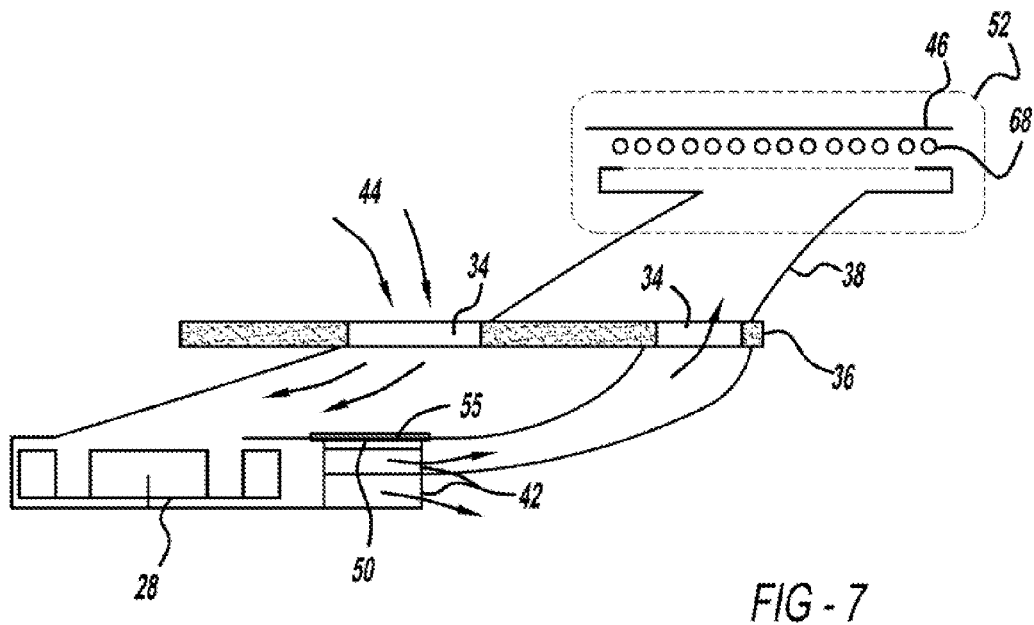
FIG. 7 illustrates a schematic side view of an exemplary aspect according to the present invention.
Figure 8:
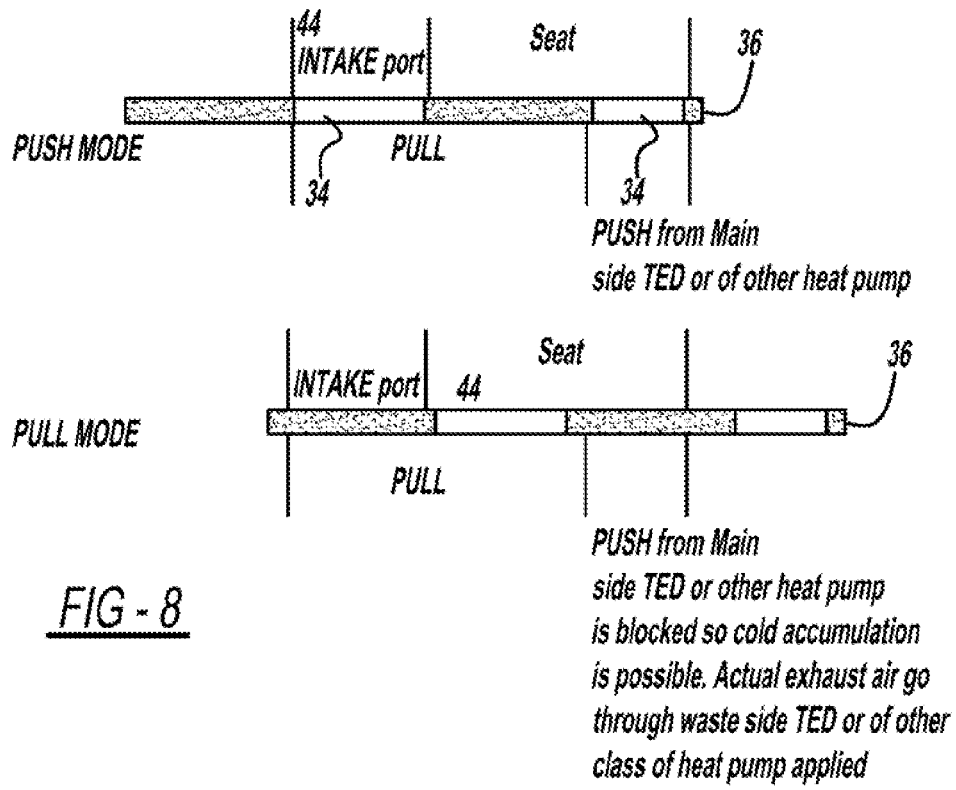
FIG. 8 illustrates a series of schematic valve opening positions according to another aspect of the present invention.
Figure 9:
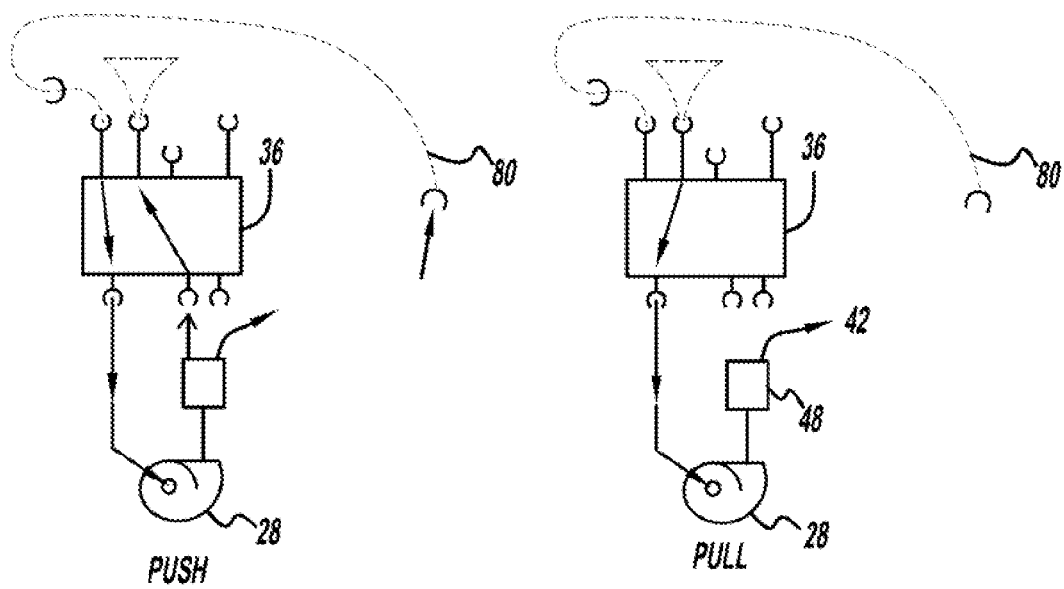
FIG. 9 illustrates a series of schematic top views according to the present invention.

In another illustrative example, as seen in FIGS. 7-9, the example shown is similar to that of FIGS. 4-6, except that the optional venting duct 40 is not present. FIG. 8 shows a schematic view of the valve opening (e.g. port 34) positions.

Figure 10:
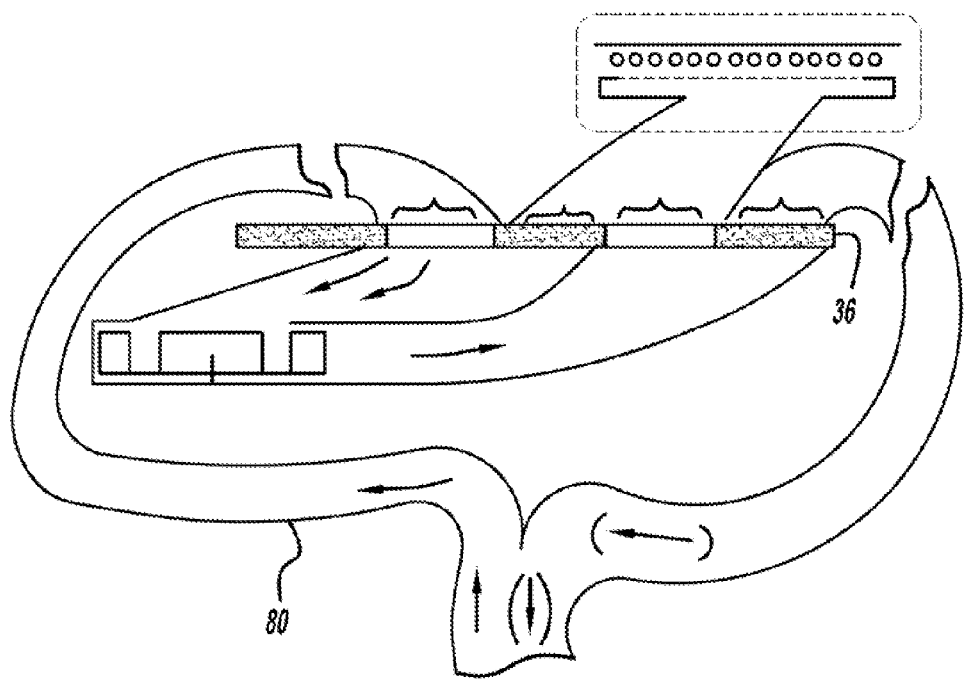
FIG. 10 illustrates a schematic side view of an exemplary aspect according to another aspect of the present invention.
Figure 11:
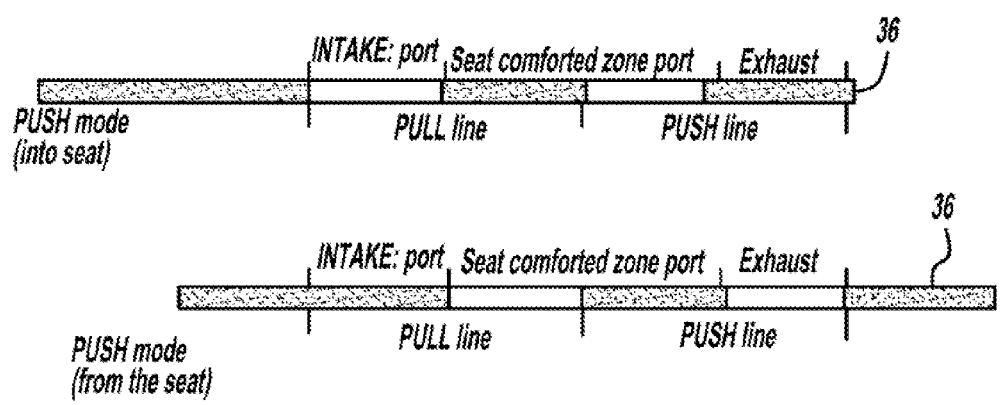
FIG. 11 illustrates a series of schematic valve opening positions according to the present invention.
Figure 12:
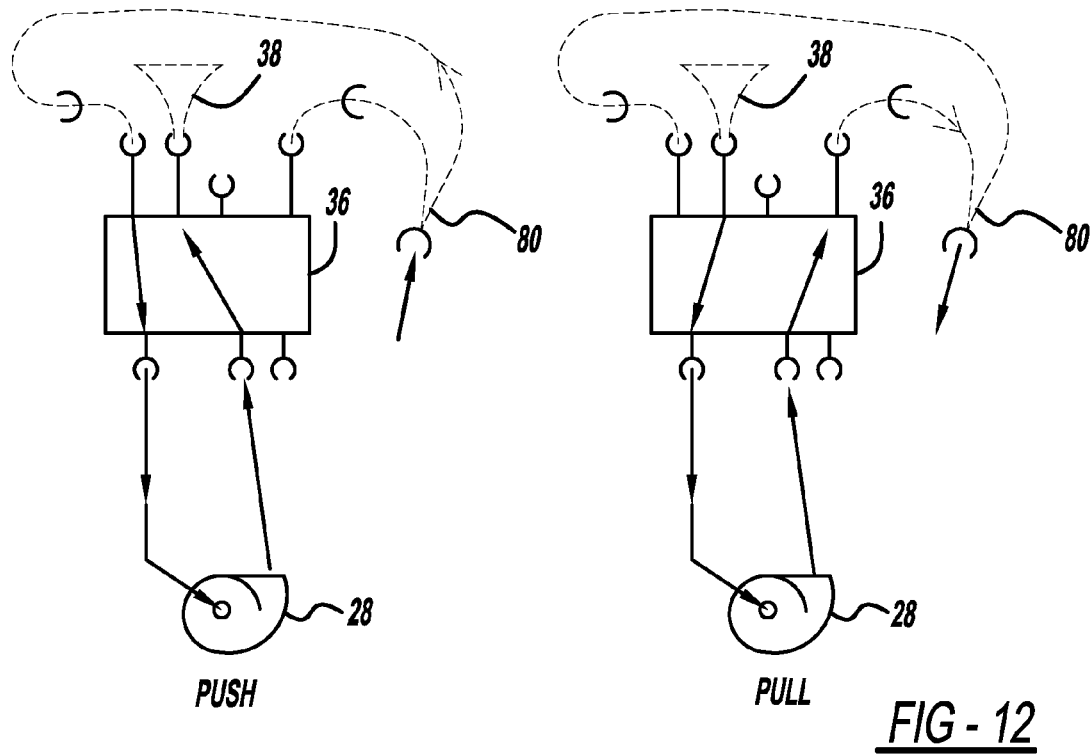
FIG. 12 illustrates a series of schematic top views according to the present invention.
Figure 13:
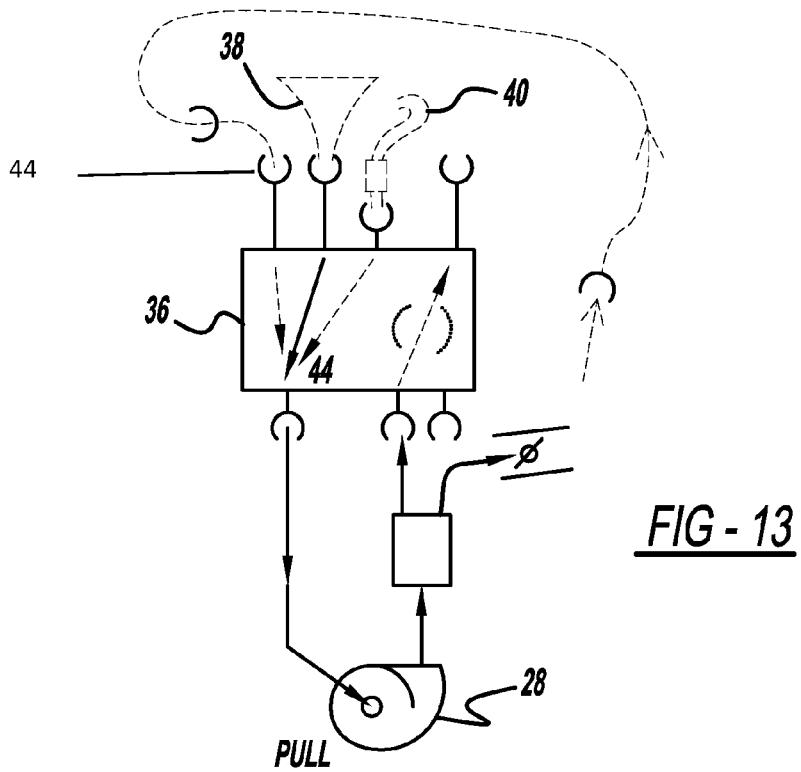
FIG. 13 illustrates a series of schematic top views according to the present invention.

In another illustrative example, as seen in FIGS. 10-12, the example shown is similar to that of FIGS. 1-3, except that an optional remote manifold system 80 is show and no vent duct 40 is present. FIG. 9 shows a schematic view of the valve opening (e.g. port 34) positions.

"Push Mode" (with Partial Nozzle Flow)

Push mode with partial Nozzle flow is generally where the air mover pushes air from the conditioning system to the seat surface 46 through the distribution system 38 and to the nozzles 74 of the ventilation ducts 40. Illustrative examples are seen in FIGS. 2, 3, 5, 6, 13, and 18, described in more detail below. Arrows depict the direction of air flow. FIGS. 2, 5 show a schematic view of the valve opening (e.g. port 34) positions. FIGS. 3, 6, 13, and 18 show examples with a conditioning device 48, although this is not necessary for the functioning of this mode of operation.

"Nozzle Flow Only"

Figure 14:
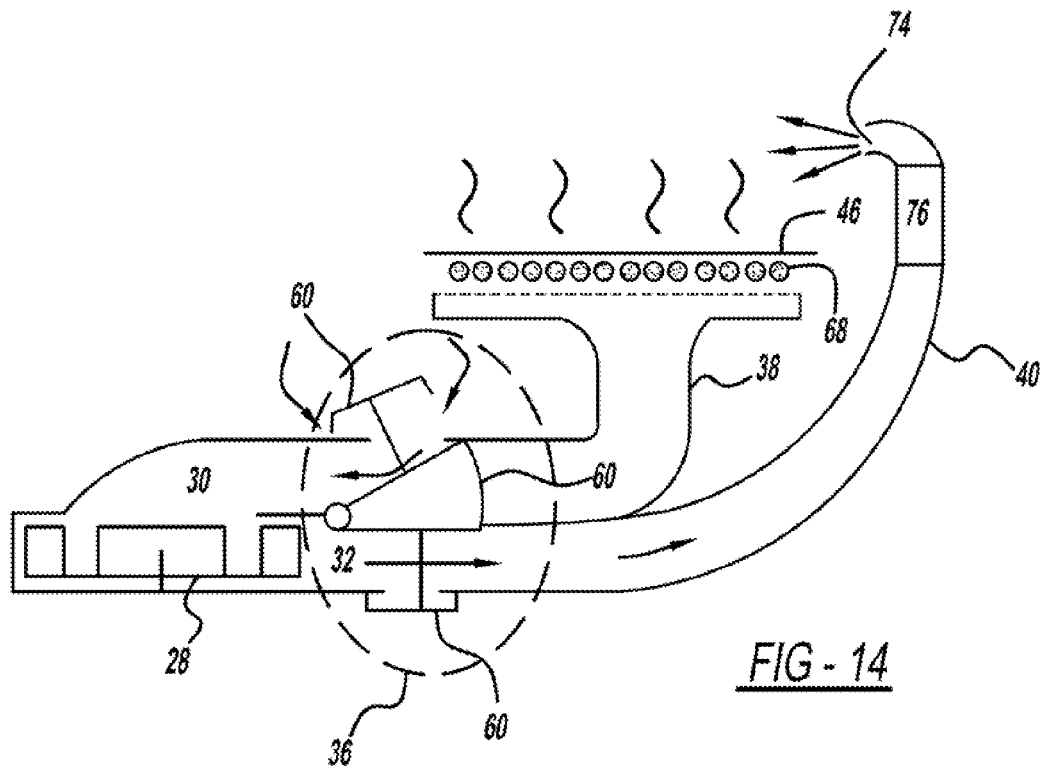
FIG. 14 illustrates a schematic side view of an exemplary aspect according to the present invention.
Figure 15:
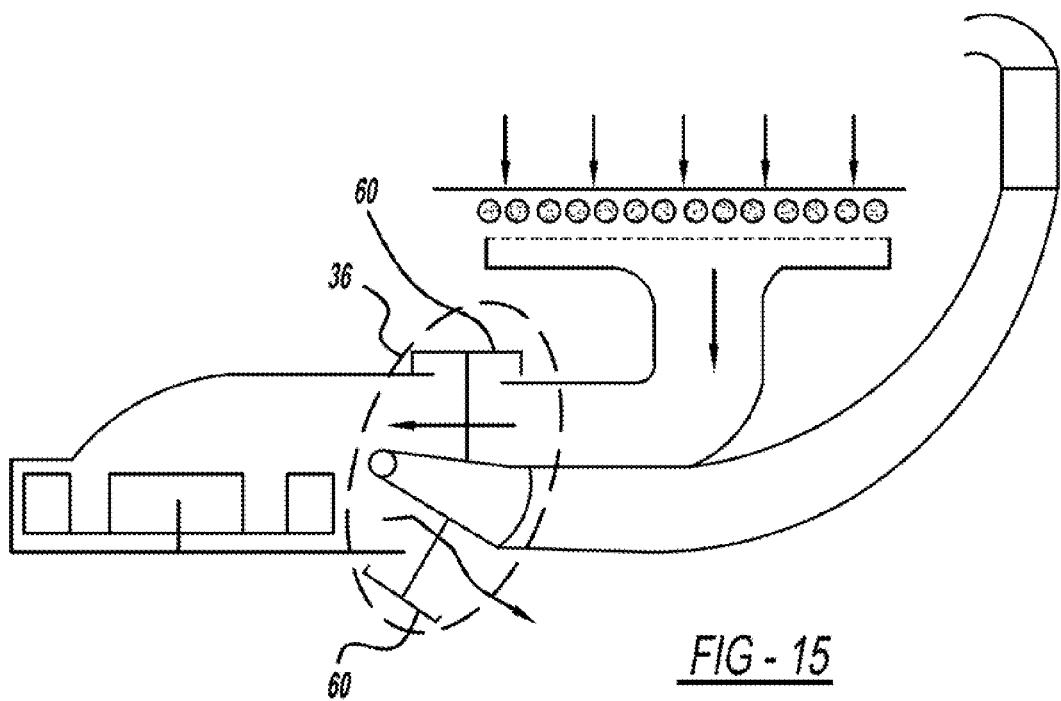
FIG. 15 illustrates schematic side view of an exemplary aspect according to the present invention.
Figure 16:
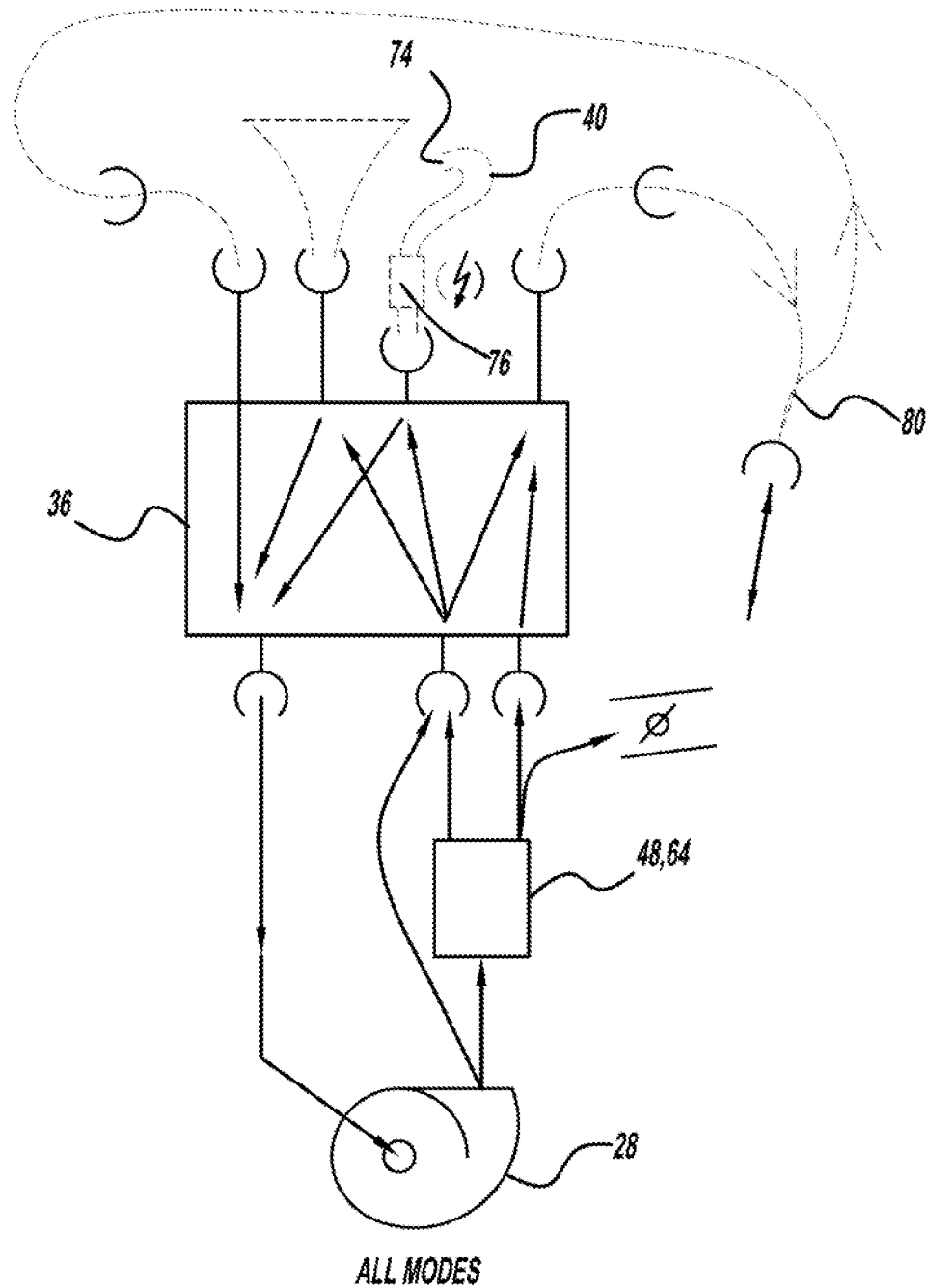
FIG. 16 illustrates a summary schematic top view according to the present invention.
Figure 17:
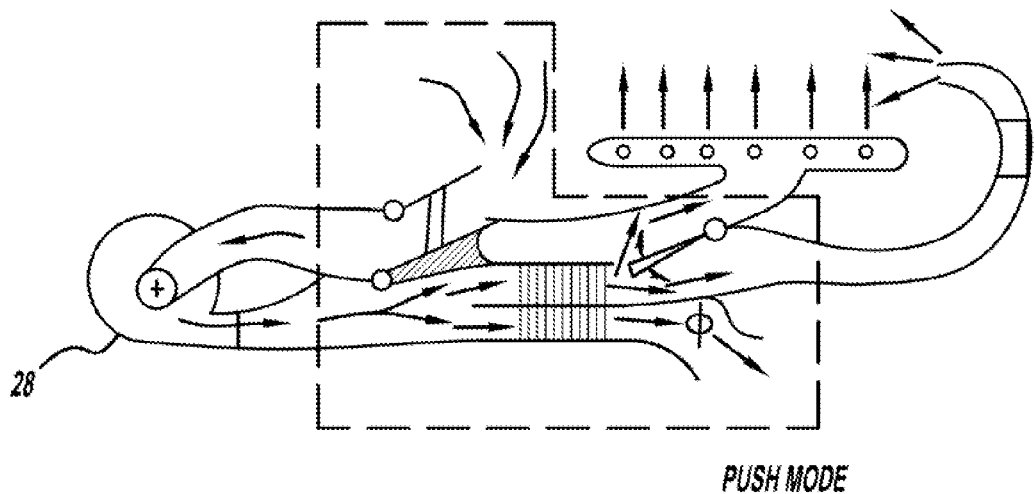
FIG. 17 illustrates a schematic side view of an exemplary aspect according to the present invention.
Figure 18:
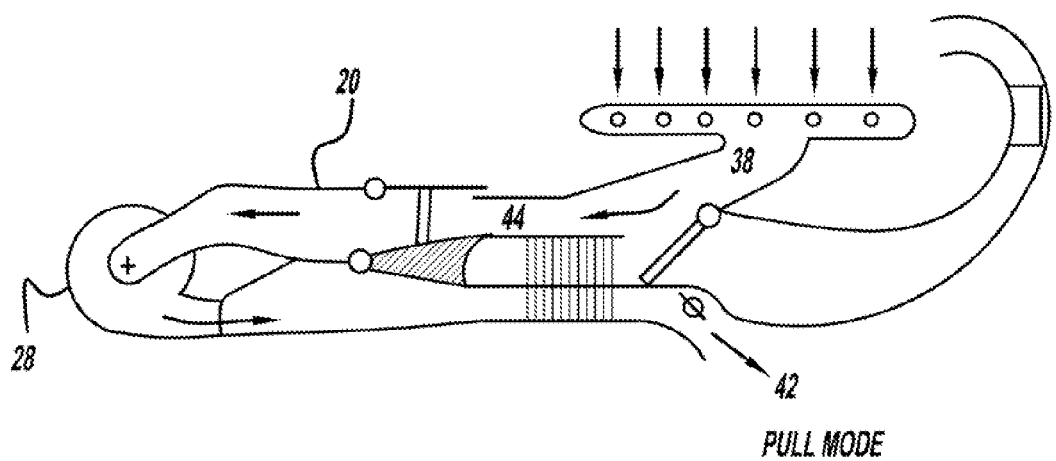
FIG. 18 illustrates a schematic side view of an exemplary aspect according to the present invention.

Nozzle flow only is an operational mode where substantially all the air is pushed from the module through the vent duct 40 and through the nozzle(s) 74. Illustrative examples can be seen in FIGS. 2, 3, 5, 6, and 14. FIGS. 2, 5 show a schematic view of the valve opening (e.g. port 34) positions. FIGS. 3, 6, and 14 show examples with a conditioning device 48 within the module and with a conditioning device 76, although this is not necessary for the functioning of this mode of operation.

"Push-Pull Mode"

In an illustrative example, as seen in FIGS. 2-3, of one possible push-pull mode configuration is described. In this example, the valve system is configured and positioned such that the input port 44 allows fluid flow from both the seat distribution system 38 and the intake port 44 into the seat conditioning module 20. It is also configured to allow fluid to flow out of the exhaust port 42 and the ventilation ducts 40.

"Pull Mode"

In an illustrative example, as seen in FIGS. 2, 3, 5, 13, and 18, show possible pull mode configurations is described. In the example shown in FIG. 18, the valve system is configured and positioned such that the input port 44 allows substantially only fluid to flow from the seat distribution system 38 into the seat conditioning module 20. It is also may be configured to allow fluid to flow out of the exhaust port 42. In the example shown in FIG. 13, the valve system is configured such that air is pulled from the input port 44, the seat surface (not shown) and from the ventilation duct 40. It is contemplated that a thermal conditioning device may include a thermal energy collection device and the thermal energy collection devices may be activated in order to optionally build up a storage of thermal energy for use at a later time and "mode" as is illustrated in FIG. 23.

Combination Mode

It is contemplated that any combination of the above operational modes may be combined in sequence (e.g. pull mode-push mode-nozzle flow-etc. . . . ) over time to provide an occupant with a unique comfort experience. This may be described as a type of thermal conditioning massage. It is contemplated that a number of combination modes may be predetermined and programmed into the control device, discussed earlier. Therefore a user could selectively choose a pre-programmed combination or alternatively they could create their own.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A seat conditioning module for a seat conditioning assembly, the seat conditioning module comprising:
    an air mover for motivating a fluid, the air mover comprising:
        at least one intake port and
        at least one outtake port,
        wherein at least one of the at least one intake port, the at least one outtake port, or both are in fluid communication with a conditioned area via a distribution channel;
    a valve assembly having a translatably movable member with two apertures movably disposed between the at least one intake port of the air mover and the at least one outtake port of the air mover so that movement of the fluid is controlled between the at least one intake port, the at least one outtake ports and the conditioned area;
    at least one actuation device for moving the valve assembly to control the passage of the fluid through the two apertures;
    a control device for at least controlling the position of the two apertures of the valve assembly, the operation of the air mover, or any combination thereof,
    wherein the valve assembly with the two apertures is translatably movable so that at least one of the two apertures is translatably moved into alignment with the at least one intake port or the at least one outtake port to control the movement of fluid through the seat conditioning assembly;
    wherein the two apertures control fluid flow:
        from an intake port to a first distribution system,
        from an intake port to a first and a second distribution systems,
        from an intake port to a second distribution system, or
        from a first distribution system to waste side exhaust.

2. The seat conditioning module of claim 1, wherein a conditioning device is included in the seat conditioning module and is in fluid communication with the air mover and the conditioned area.

3. The seat conditioning module of claim 2, wherein the conditioning device is a thermoelectric device for heating, cooling or both the fluid.

4. The seat conditioning module of claim 1, wherein the seat conditioning assembly includes a dedicated heater device disposed within 25 mm of a seat surface.

5. The seat conditioning module of claim 1, further including at least one thermal collection device for storing thermal energy that is located between the air mover and a seat.

6. The seat conditioning module of claim 1, wherein the first distribution system is disposed adjacent to the seat surface for fluidly communicating air from the seat conditioning module to an area of a seat occupant, or from the area of the seat occupant.

7. The seat conditioning module of claim 1, wherein the air mover is disposed in an air-impermeable housing defining a hollow chamber including at least one opening which the valve assembly is disposed upon and is fluidly connected to the at least one input and the at least one output ports, wherein at least one of the ports is defined by an air-impermeable hollow tubular structure.

8. The seat conditioning module of claim 1, wherein the seat conditioning module includes a push mode where the air mover pushes air from the seat conditioning module through a seat surface.

9. The seat conditioning module of claim 1, wherein the seat conditioning module includes a pull mode where the air mover pulls air from a seat surface through the seat conditioning module.

10. The seat conditioning module of claim 1: wherein the valve assembly having a translatably movable member with two apertures is a plate member that is a substantially air-impermeable layer or layers.

11. The seat conditioning module of claim 2, wherein the seat conditioning module includes a pull mode position, where one of the two apertures is moved so that air flow from the conditioning module is blocked or air flow exhausts significantly through a waste port of the conditioning module.

12. The seat conditioning module of claim 11, wherein the valve assembly having a translatably movable member with two apertures is a plate member that is a substantially air-impermeable layer or layers.

13. The seat conditioning module of claim 2, wherein the valve assembly includes a push mode with partial nozzle flow position, where air from the conditioning module is moved partially through one of the two apertures into a seat and partially through one of the two apertures into a nozzle assembly that directs air output from the nozzle assembly to an occupant's head, shoulders, neck, feet, or arms.

14. The seat conditioning module of claim 2, wherein the valve assembly includes a push mode where all the air from the conditioning module is directed through one of the two apertures into a nozzle assembly that directs air output through the nozzles nozzle assembly to an occupant's head, shoulders, neck, feet or arms.

15. The seat conditioning module of claim 2, wherein the valve assembly includes a push mode position, where all the air from the conditioning module is directed through one of the two apertures into a seat.

* * * * *